United States Patent
Park et al.

(10) Patent No.: US 12,278,502 B2
(45) Date of Patent: *Apr. 15, 2025

(54) METHOD AND APPARATUS FOR CONTROLLING WIRELESS POWER TRANSMISSION

(71) Applicant: LG INNOTEK CO., LTD., Seoul (KR)

(72) Inventors: Yu Ri Park, Seoul (KR); Yong Il Kwon, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/356,087

(22) Filed: Jul. 20, 2023

(65) Prior Publication Data

US 2023/0361624 A1 Nov. 9, 2023

Related U.S. Application Data

(63) Continuation of application No. 18/117,631, filed on Mar. 6, 2023, which is a continuation of application
(Continued)

(30) Foreign Application Priority Data

May 16, 2018 (KR) .................. 10-2018-0056166
Jun. 15, 2018 (KR) .................. 10-2018-0068751

(51) Int. Cl.
*H02J 50/60* (2016.01)
*H02J 7/02* (2016.01)
(Continued)

(52) U.S. Cl.
CPC ............ *H02J 50/60* (2016.02); *H02J 7/02* (2013.01); *H02J 50/12* (2016.02); *H02J 50/20* (2016.02);
(Continued)

(58) Field of Classification Search
None
See application file for complete search history.

(56) References Cited

U.S. PATENT DOCUMENTS 9,536,656 B2   1/2017 Oettinger et al.
2013/0127410 A1   5/2013 Park et al.
(Continued)

FOREIGN PATENT DOCUMENTS

EP   2 779 359 B1   9/2017
JP   2013-519355 A   5/2013
(Continued)

OTHER PUBLICATIONS

"The Qi Wireless Power Transfer System, Power Class 0 Specification," Wireless Power Consortium, Parts 1 and 2: Interface Definitions, Version 1.2.2, Apr. 2016, 62 pages total.

*Primary Examiner* — Daniel Kessie
(74) *Attorney, Agent, or Firm* — Birch, Stewart, Kolasch & Birch, LLP

(57) ABSTRACT

A method of receiving power of a wireless power receiver, including a signal transmission phase of transmitting a signal including an FOD status packet to a wireless power transmitter; a power reception phase of receiving a first power from the wireless power transmitter when a NAK response indicating that a foreign object is present in the charging area of the wireless power transmitter is received from the wireless power transmitter, or receiving a second power from the wireless power transmitter when an ACK response indicating that the foreign object is not present in the charging area of the wireless power transmitter is received from the wireless power transmitter, in response to the FOD status packet; a phase of transmitting a reception power packet including information on reception power intensity to the wireless power transmitter; and a phase of receiving a signal including information on a result of
(Continued)

determining whether the foreign object is present in the charging area from the wireless power transmitter using information measured or calculated by the wireless power transmitter in response to the reception power packet, while receiving the second power.

9 Claims, 18 Drawing Sheets

Related U.S. Application Data

No. 17/830,993, filed on Jun. 2, 2022, now Pat. No. 11,626,762, which is a continuation of application No. 17/055,404, filed as application No. PCT/KR2019/005881 on May 16, 2019, now Pat. No. 11,381,119.

(51) Int. Cl.
*H02J 50/12* (2016.01)
*H02J 50/20* (2016.01)
*H02J 50/80* (2016.01)
*H02J 50/90* (2016.01)
*H04L 5/00* (2006.01)
*H02J 50/40* (2016.01)

(52) U.S. Cl.
CPC .............. *H02J 50/80* (2016.02); *H02J 50/90* (2016.02); *H04L 5/0055* (2013.01); *H02J 50/402* (2020.01)

(56) References Cited

U.S. PATENT DOCUMENTS

| | | |
|---|---|---|
| 2014/0077616 A1 | 3/2014 | Baarman et al. |
| 2014/0111163 A1 | 4/2014 | Kwon et al. |
| 2014/0253028 A1 | 9/2014 | Du et al. |
| 2014/0266036 A1 | 9/2014 | Jung et al. |
| 2015/0123602 A1 | 5/2015 | Patino et al. |
| 2016/0301261 A1 | 10/2016 | Schorpp |
| 2016/0336759 A1 | 11/2016 | Yamamoto et al. |
| 2017/0018977 A1 | 1/2017 | Van Wageningen et al. |
| 2017/0093214 A1 | 3/2017 | Watanabe et al. |
| 2017/0229926 A1 | 8/2017 | Oettinger et al. |
| 2017/0317536 A1 | 11/2017 | Marson et al. |
| 2019/0131828 A1 | 5/2019 | Park et al. |
| 2019/0222073 A1* | 7/2019 | Lee .................. H02J 50/10 |
| 2020/0076244 A1 | 3/2020 | Smith et al. |
| 2020/0189862 A1 | 6/2020 | Moritomo |
| 2020/0366136 A1 | 11/2020 | Tachiwa |

FOREIGN PATENT DOCUMENTS

| | | |
|---|---|---|
| JP | 2014-183731 A | 9/2014 |
| JP | 2014-230299 A | 12/2014 |
| JP | 2015-536633 A | 12/2015 |
| JP | 2016-531538 A | 10/2016 |
| JP | 2016-189693 A | 11/2016 |
| JP | 2017-38509 A | 2/2017 |
| JP | 2017-511109 A | 4/2017 |
| JP | 2017-209011 A | 11/2017 |
| JP | 2018-503063 A | 2/2018 |
| KR | 10-2013-0055199 A | 5/2013 |
| KR | 10-2014-0050517 A | 4/2014 |
| KR | 10-2014-0113147 A | 9/2014 |
| KR | 10-2017-0118571 A | 10/2017 |
| KR | 10-2017-0140685 A | 12/2017 |
| KR | 10-1812444 B1 | 12/2017 |
| KR | 10-2018-0003810 A | 1/2018 |
| KR | 10-2018-0022513 A | 3/2018 |
| KR | 10-2018-0038205 A | 4/2018 |
| WO | WO 2017/146389 A1 | 8/2017 |
| WO | WO 2017/217663 A1 | 12/2017 |
| WO | WO 2018/020890 A1 | 2/2018 |
| WO | WO 2018/038531 A1 | 3/2018 |

* cited by examiner

METHOD AND APPARATUS FOR CONTROLLING WIRELESS POWER TRANSMISSION

CROSS-REFERENCE TO RELATED APPLICATIONS

This application is a Continuation of U.S. application Ser. No. 18/117,631 filed on Mar. 6, 2023, which is a Continuation of U.S. application Ser. No. 17/830,993 filed on Jun. 2, 2022 (now U.S. Pat. No. 11,626,762 issued on Apr. 11, 2023), which is a Continuation of U.S. application Ser. No. 17/055,404 filed on Nov. 13, 2020 (now U.S. Pat. No. 11,381,119 issued on Jul. 5, 2022), which is the National Phase of PCT International Application No. PCT/KR2019/005881 filed on May 16, 2019, which claims the priority benefit under 35 U.S.C. § 119 (a) to Korean Application Nos. 10-2018-0056166 filed on May 16, 2018 and 10-2018-0068751 filed on Jun. 15, 2018, both filed in the Republic of Korea, all of which are hereby expressly incorporated by reference into the present application.

BACKGROUND OF THE INVENTION

Field of the Invention

Embodiments relate to a wireless power transmission technology, and more particularly, to a method and apparatus for controlling wireless power transmission for wireless charging.

Discussion of the Related Art

Recently, with rapid development of information and communication technology, a society based on ubiquitous information and communication technology has been formed.

In order to connect information and communication apparatuses anywhere and anytime, sensors each having a computer chip having a communication function need to be installed in all social facilities. Accordingly, problems related to supply of power to such apparatuses or sensors have newly arisen. In addition, as portable apparatuses such as mobile phones, Bluetooth handsets and music players such as iPod have rapidly increased, it takes time and effort for a user to charge batteries. As a method for solving such a problem, recently, wireless power transmission technology is attracting considerable attention.

Wireless power transmission or wireless energy transfer technology refers to technology of wirelessly transmitting electric energy from a transmitter to a receiver using the principle of magnetic induction. In the 1800s, electrical motors or transformers using the principle of electromagnetic induction already started to be used and then methods of radiating radio waves or electromagnetic waves such as lasers and transmitting electric energy were also attempted. Commonly used electric toothbrushes or electric razors are charged using the principle of electromagnetic induction.

Up to now, a wireless energy transfer method may be roughly divided into a magnetic induction method, an electromagnetic resonant method and a power transmission method using a short-wavelength radio frequency.

The magnetic induction method refers to technology of using a phenomenon that, when two coils are adjacently placed and current is supplied to one coil, a magnetic flux is generated to generate electromotive force in the other coil, and is commercially available in small apparatuses such as mobile phones. The magnetic induction method may transmit power of a maximum of several kilowatts (KW) and has high efficiency. However, since a maximum transmission distance is 1 cm or less, an apparatus should be generally located to be adjacent to a charger.

The magnetic induction method uses an electric field or a magnetic field instead of electromagnetic waves or current. The magnetic induction method is hardly influenced by an electromagnetic wave and thus is harmless to other electronic apparatuses and humans. In contrast, the magnetic induction method may be used at a limited distance and in a limited space and energy transfer efficiency is slightly low.

The short-wavelength wireless power transmission method-briefly referred to as an RF method-uses a method of directly transmitting and receiving energy in the form of radio waves. This technology is an RF type wireless power transmission method using a rectenna. Rectenna means is a compound word of "antenna" and "rectifier" and means an element for directly converting RF power into direct current (DC) power. That is, the RF method is technology of converting AC radio waves into DC radio waves and using DC radio waves and, recently, research into commercialization thereof has been actively conducted as efficiency is improved.

Wireless power transmission technology may be variously used in IT, railroad and consumer-electronics in addition to the mobile industry.

If a conductor which is not a wireless power receiver—that is, a foreign object (FO)—is present in a wireless charging area, an electromagnetic signal received from a wireless power transmitter may be induced in the FO. For example, the FO may include coins, clips, pins, and ballpoint pens.

If an FO is present between a wireless power receiver and a wireless power transmitter, wireless charging efficiency may be significantly lowered, and the temperatures of the wireless power receiver and the wireless power transmitter may increase due to increase in ambient temperature of the FO. If the FO located in the charging area is not quickly removed, power waste may occur and the wireless power transmitter and the wireless power receiver may be damaged due to overheating.

Even if an FO is not present in an actual charging area, when a wireless power transmitter incorrectly determines that an FO is present in a charging area, charging may be stopped.

Accordingly, accurate detection of the FO on a charging area is becoming an important issue in wireless charging technology.

SUMMARY OF THE INVENTION

Embodiments provide a method and apparatus for controlling wireless power transmission for wireless charging.

Embodiments provide a wireless power transmitter for more accurately detecting a foreign object.

Embodiments provide a method and apparatus for controlling wireless power transmission for minimizing foreign object detection error to prevent unnecessary stop of charging.

Further, embodiments provide a wireless power transmitter for preventing a device from being damaged due to a foreign object and for seamless charging through adaptive transmission power control according to whether the foreign object is present.

Additional advantages, objects, and features of embodiments of the disclosure will be set forth in part in the description which follows and in part will become apparent to those having ordinary skill in the art upon examination of the following or may be learned from practice of embodiments of the disclosure. The objectives and other advantages of embodiments of the disclosure may be realized and attained by the structure particularly pointed out in the written description and claims hereof as well as the appended drawings.

Embodiments provide a method of controlling wireless power transmission and apparatuses therefor.

In one embodiment, a method of controlling wireless power transmission of a wireless power transmitter includes a first packet reception phase of receiving a foreign object detection status packet, a first determination phase of determining whether the foreign object is present based on the foreign object detection status packet, and a power control phase of controlling power based on a determination result of the first determination phase, wherein the power control phase includes a first power transfer mode for transmitting first power upon determining that the foreign object is present as the determination result of the first determination phase, and a second power transfer mode for transmitting second power upon determining that the foreign object is not present as the determination result of the first determination phase.

The second power may be greater than the first power, and power between the first power and the second power may be increasingly or decreasingly transmitted based on a change in a power transmission environment in the second power transfer mode.

The first power may be 5 W.

The second power may be 15 W.

The method may further include a second determination phase of determining whether the foreign object is present in the first power transfer mode.

The second determination phase may include at least one of a third determination phase of determining whether the foreign object is present based on loss of transmission power, or a fourth determination phase of determining whether the foreign object is present based on a temperature change.

The third determination phase may include measuring intensity of the transmission power, receiving information on intensity of reception power corresponding to the transmission power from a wireless power receiver, estimating power loss based on a difference value between the intensity of the transmission power and the intensity of the reception power, and comparing the estimated power loss with a predetermined power loss reference value to determine whether the foreign object is present for a predetermined time period.

The fourth determination phase may include measuring temperature of a charging area, calculating a temperature change for a predetermined time period based on the measured temperature, and comparing the calculated temperature change with a predetermined temperature change reference value to determine whether the foreign object is present.

As a determination result of the second determination phase, when the foreign object is determined to be present, power transmission may be stopped, and as the determination of the second determination phase, when the foreign object is not determined to be present, the first power transfer mode may be changed to the second power transfer mode.

In another embodiment, a method of controlling wireless power transmission of a wireless power transmitter includes a first packet reception phase of receiving a foreign object detection status packet, a first determination phase of determining whether the foreign object is present based on the foreign object detection status packet, a phase of transmitting first power upon determining that the foreign object is present as a determination result of the first determination phase, a phase of transmitting power between the first power and the second power when the foreign object is not present as the determination result of the first determination phase, and a second determination phase of determining whether the foreign object is present in the phase of transmitting the first power, wherein the second determination phase includes at least one of a third determination phase of determining whether the foreign object is present based on loss of transmission power, or a fourth determination phase of determining whether the foreign object is present based on a temperature change.

In another embodiment, a wireless power transmitter includes an antenna configured to wirelessly transmit power, a demodulator configured to demodulate a signal including a foreign object detection status packet received from the antenna, and a controller configured to determine whether the foreign object is present, wherein the controller performs a first determination phase of determining whether the foreign object is present based on the foreign object detection status packet, performs control to transmit first power upon determining that the foreign object is present as a result of the first determination phase, and performs control to transmit power between the first power and the second power upon determining the foreign object is not present as the determination result of the first determination phase.

The controller may perform a second determination phase of determining whether the foreign object is present during transmission of the first power upon determining that the foreign object is present as a result of the first determination phase.

The second determination phase may include at least one of a third determination phase of determining whether the foreign object is present based on loss of transmission power, or a fourth determination phase of determining whether the foreign object is present based on a temperature change.

The wireless power transmitter may further include a sensor configured to measure intensity of the transmission power and to transmit the intensity of the transmission power to the controller, wherein, in the third determination phase, the controller may receive information on intensity of reception power corresponding to the transmission power through the demodulator, may estimate power loss based on a difference value between the intensity of the transmission power and the intensity of the reception power, and may compare the estimated power loss with a predetermined power loss reference value to determine whether the foreign object is present for a predetermined time period.

The sensor may measure temperature and may transmit information on the temperature to the controller, and in the fourth determination phase, the controller may calculate a temperature change for a predetermined time period based on the measured temperature, and may compare the calculated temperature change with a predetermined temperature change reference value to determine whether the foreign object is present.

As a determination result of the second determination phase, when the foreign object is determined to be present, the controller may stop power transmission, and as determination of the second determination phase, when the foreign object is not determined to be present, the controller may perform control to transmit power between the first power and the second power.

The second power may be greater than the first power, and the first power may be 5 W.

In another embodiment, a method of controlling wireless power transmission of a wireless power transmitter includes a first packet reception phase of receiving a foreign object detection status packet, a first determination phase of determining whether the foreign object is present based on the foreign object detection status packet, and a first power adjustment phase of adjusting power based on a determination result of the first determination phase.

The first power adjustment phase may include maintaining guaranteed power to second power as initial setting when the foreign object is not present as a determination result of the first determination phase, and downward-adjusting the guaranteed power from the second power to first power when the foreign object is present as a determination result of the first determination phase.

The first power may be equal to or less than 5 W.

The second power may be equal to or less than 15 W.

The method may further include a power transfer phase of performing charging based on the adjusted power and a second determination phase of determining whether the foreign object is present in the power transfer phase.

The second determination phase may include a third determination phase of determining whether the foreign object is present based on the estimated power loss during charging, wherein, when the foreign object is present as a determination result of the third determination phase, the performed charging may be stopped.

The third determination phase may include measuring intensity of transmission power during charging, receiving information on reception power corresponding to the transmission power from a wireless power receive, estimating power loss based on a difference value between intensity of the transmission power and intensity of the reception power, and comparing the estimated power loss with a predetermined power loss reference value to determine whether the foreign object is present for a predetermined time period.

The second determination phase may include a fourth determination phase of determining whether the foreign object is present based on a temperature change during charging, wherein, when the foreign object is present as a determination result of the fourth determination phase, the performed charging may be stopped.

The fourth determination phase may include measuring temperature of a charging area, calculating a temperature change for a predetermined time period based on a result of the measuring of the temperature, and comparing the calculated temperature change with a predetermined temperature change reference value to determine whether the foreign object is present.

The method may further include a renegotiation phase of resetting guaranteed power by renegotiating a power transfer contract when the foreign object is not present as a determination result of the third determination phase or the fourth determination phase.

The second determination phase may include a third determination phase of determining whether the foreign object is present based on the estimated power loss during charging, and a fourth determination phase of determining whether the foreign object is present based on a temperature change measured during charging when the foreign object is present as a determination result of the third determination phase, wherein power transmission for charging may be stopped for the predetermined time period when the foreign object is present as a determination result of the fourth determination phase.

The method may further include transmitting a response based on a determination result of the first determination phase, wherein the response may be a response indicating that the foreign object is present, and when currently set guaranteed power is greater than first power, intensity of power may be downward-adjusted to the first power or less.

The first power may be 5 W.

The first determination phase may include determining a quality factor threshold value based on a reference quality factor value included in the foreign object detection status packet and comparing a premeasured quality factor value with the quality factor threshold value to determine whether the foreign object is present.

In another embodiment, a wireless power transmitter may include a transmission antenna configured to wirelessly transmit power, a demodulator configured to demodulate a signal of the transmission antenna and to receive a foreign object detection status packet, and a controller configured to determine whether the foreign object is present based on the demodulated foreign object detection status packet, wherein the controller adjusts intensity of the wireless power based on a determination result of whether the foreign object is present.

When the foreign object is not present as a determination result of the controller, guaranteed power may be maintained to second power as initial setting, and when the foreign object is present as the determination result of the controller, the guaranteed power may be downward-adjusted to first power from the second power.

The first power may be equal to or less than 5 W.

The controller may further determine whether the foreign object is present during charging with the adjusted intensity of the wireless power.

In one aspect, the controller may determine whether the foreign object based on the estimated power loss during charging, and as a determination result of the power loss, when the foreign object is present, the controller may stop the power transmission for charging.

The wireless power transmitter may further include a sensor configured to transmit information on intensity of the transmission power to the controller, wherein the controller may estimate power loss based on information on the intensity of transmission power during charging and information on the intensity of reception power received from the wireless power receiver to correspond to the transmission power and may compare the estimated power loss with a preset power loss reference value to determine whether the foreign object is present.

In another aspect, the wireless power transmitter may further include a sensor configured to transmit information on the measured information to the controller, wherein the controller determines whether the foreign object is present based on the calculated temperature change using the measured temperature during charging, and as a determination result based on the temperature change, when the foreign object is present, the controller may stop power transmission for charging.

In another aspect, the controller may determine whether the foreign object is present based on the estimated power loss during charging, when the foreign object is present as a determination result based on the power loss, when the foreign object is present, the controller may determine whether the foreign object is present based on the measured temperature change during charging, and as a determination result based on the temperature change, when the foreign object is present, the controller may stop power transmission for charging within a predetermined time period.

As the additional determination result, when the foreign object is not present, the controller may renegotiate a power transfer contract with the corresponding wireless power receiver to reset guaranteed power.

The controller may transmit a response indicating that the foreign object is present according to a determination result of whether the foreign object is present, and when currently set guaranteed power is greater than first power, the controller may downward-adjust intensity of power to the first power or less.

In another embodiment, a computer readable recording medium having recorded thereon a program for executing the methods of wireless controlling power transmission may be provided.

It is to be understood that both the foregoing general description and the following detailed description of embodiments of the disclosure are exemplary and explanatory and are intended to provide further explanation of the disclosure as claimed.

BRIEF DESCRIPTION OF THE DRAWINGS

Arrangements and embodiments may be described in detail with reference to the following drawings in which like reference numerals refer to like elements and wherein.

DETAILED DESCRIPTION OF THE EMBODIMENTS

Figure 1:
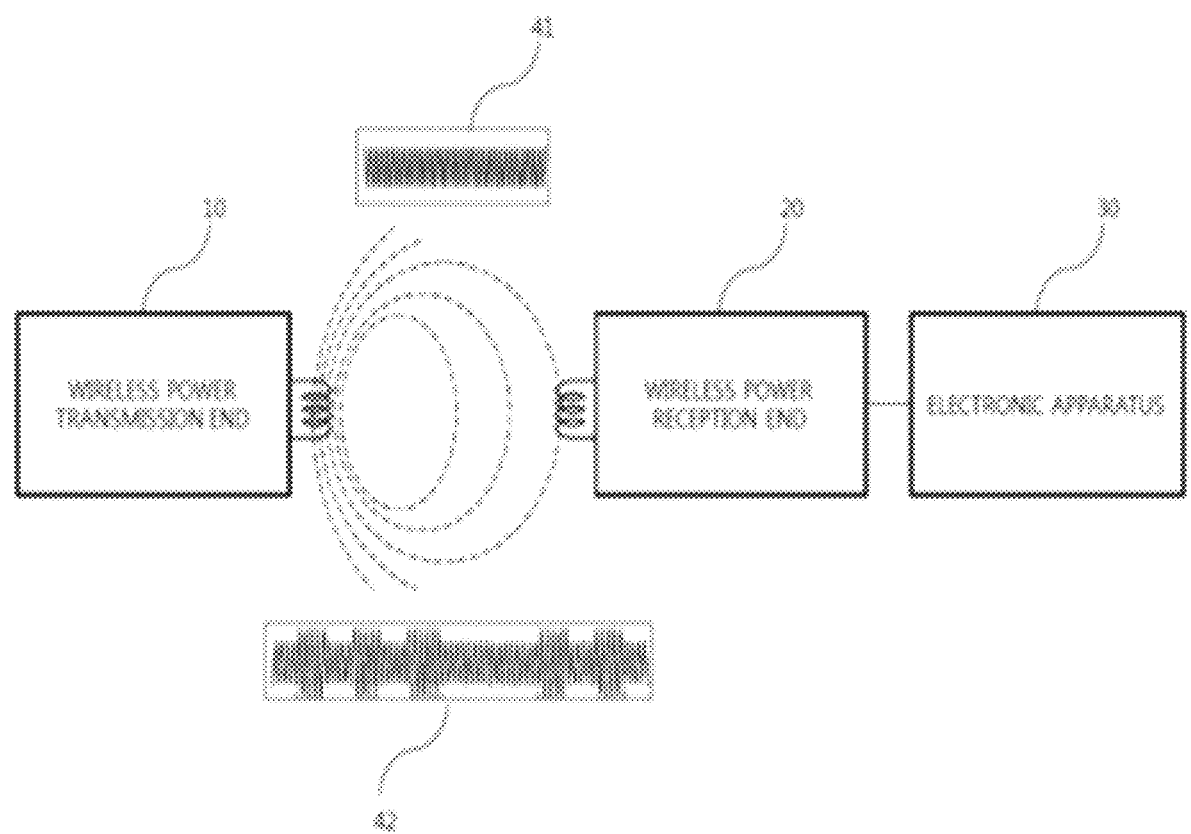
FIG. 1 is a block diagram for explanation of a wireless charging system according to an embodiment.

Reference will now be made in detail to the preferred embodiments of the disclosure, examples of which are illustrated in the accompanying drawings. The suffixes "module" and "unit" of elements herein are used for convenience of description and thus may be used interchangeably and do not have any distinguishable meanings or functions.

In description of exemplary embodiments, the suffixes "module" and "unit" of elements herein are embodied as a hardware element, for example, a circuit device, a microprocessor, a memory, and a sensor, but this is merely an embodiment and a partial or entire function of the corresponding element may be embodied in the form of software.

In description of exemplary embodiments, it will be understood that, when an element is referred to as being "on" or "under" another element, the element can be directly on another element or intervening elements may be present. In addition, when an element is referred to as being "on" or "under" another element, this may include the meaning of an upward direction or a downward direction based on one component.

In the following description of the embodiments, for convenience of description, an apparatus for wirelessly transmitting power in a wireless power transmission system may be used interchangeably with a wireless power transmitter, a wireless power transmission apparatus, a transmission end, a transmitter, a transmission apparatus, a transmission side, etc. In addition, for convenience of description, an apparatus having a function of wirelessly receiving power from a wireless power transmission apparatus may be used interchangeably with a wireless power reception apparatus, a wireless power receiver, a reception terminal, a reception side, a reception apparatus, a receiver, etc.

A transmitter according to the disclosure may be configured in the form of a pad, a cradle, an access point (AP), a small base station, a stand, a ceiling insert type, a wall-hanging type, or the like, and one transmitter may simultaneously transmit power to a plurality of wireless power reception apparatuses. To this end, a transmitter may include at least one wireless power transmission element.

Here, a wireless power transmission element may use various wireless power transmission standards based on an electromagnetic induction method of charging according to the electromagnetic induction principle that a magnetic field is generated from a coil of a power transmission end and electricity is induced from a coil of a reception end under the influence of the magnetic field. For example, the wireless power transmission standards may include wireless charging technology of an electromagnetic induction method defined in wireless power consortium (WPC) Qi and power matters alliance (PMA).

In addition, a wireless power receiver according to an embodiment may include at least one wireless power reception element and may wirelessly receive power from one or more transmitter.

In addition, a receiver according to the disclosure may be mounted on a small-size electronic apparatus such as a mobile phone, a smartphone, a laptop, a digital broadcasting terminal, a personal digital assistants (PDA), a portable multimedia player (PMP), a navigation system, an MP3 player, an electric toothbrush, a radio frequency identification (RFID) tag, an illumination apparatus, a remote controller, a bobber, and a smart watch without being limited thereto. Accordingly, the receiver may be any device as long as the receiver includes the wireless power reception element according to the disclosure to charge a battery.

FIG. 1 is a block diagram for explanation of a wireless charging system according to an embodiment.

Referring to FIG. 1, the wireless charging system may broadly include a wireless power transmission end 10 configured to wirelessly transmit power, a wireless power reception end 20 configured to receive the transmission power, and an electronic device 30 configured to receive the received power.

For example, the wireless power transmission end 10 and the wireless power reception end 20 may perform in-band communication of exchanging information using the same frequency band as an operation frequency used in wireless power transmission.

In the in-band communication, upon receiving a power signal 41 transmitted from the wireless power transmission end 10, the wireless power reception end 20 may modulate the received power signal and may transmit the modulated signal 42 to the wireless power transmission end 10.

In another example, the wireless power transmission end 10 and the wireless power reception end 20 may also perform out-of-band communication of exchanging information using separate frequency bands different from an operation frequency used in wireless power transmission.

For example, information exchanged between the wireless power transmission end 10 and the wireless power reception end 20 may include control information as well as state information of each other.

Here, the state information and the control information that are exchanged between transmission and reception ends will be obviously understood with reference to a description of the following embodiments.

The in-band communication and the out-of-band communication may provide bi-directional communication without being limited thereto. According to another embodiment, unidirectional communication or half-duplex communication may also be provided.

For example, in the unidirectional communication, the wireless power reception end 20 may transmit information only to the wireless power transmission end 10 without being limited thereto, and the wireless power transmission end 10 may also transmit information only to the wireless power reception end 20.

In the half-duplex communication, bi-directional communication may be enabled between the wireless power reception end 20 and the wireless power transmission end 10, but it may be possible to transmit information by only one device at any one time point.

The wireless power reception end 20 according to an embodiment may acquire various pieces of state information of the electronic device 30.

For example, the state information of the electronic device 30 may include current power usage information, information for identifying executed application, CPU usage information, battery charging state information, battery output voltage/current information, and the like, without being limited thereto, and may include any information that is capable of being acquired from the electronic device 30 and being used in wireless power control.

In particular, the wireless power transmission end 10 according to an embodiment may transmit a predetermined packet indicating whether high-speed charging is supported, to the wireless power reception end 20.

Upon checking that the wireless power transmission end 10 connected to the wireless power reception end 20 supports a high-speed charging mode, the wireless power reception end 20 may notify the electronic device 30 about this.

The electronic device 30 may display information indicating that high-speed charging is possible through a predetermined display device included therein—e.g., a liquid crystal display (LCD) device—.

Figure 2:
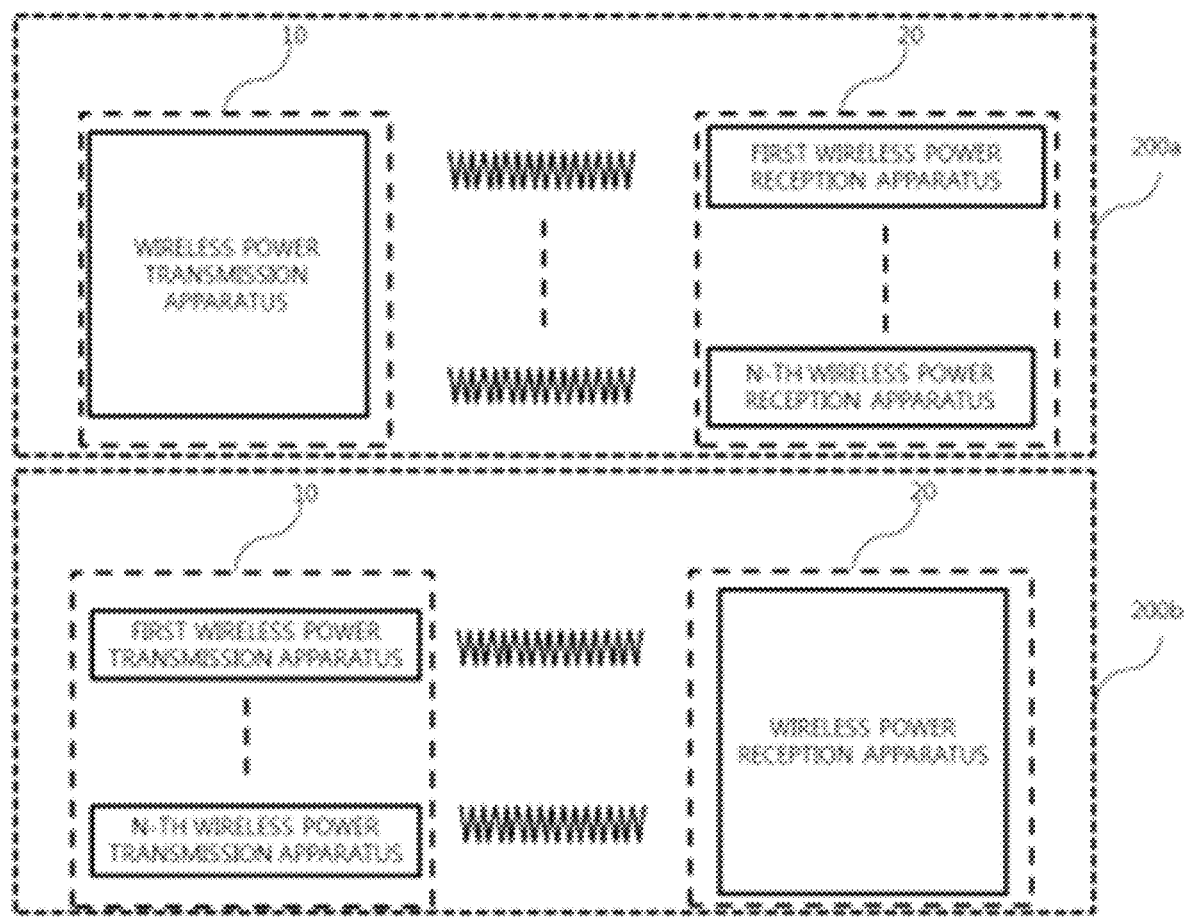
FIG. 2 is a block diagram for explanation of a wireless charging system according to another embodiment.

FIG. 2 is a block diagram for explanation of a wireless charging system according to another embodiment.

For example, as shown in a reference numeral 200a, the wireless power reception end 20 may include a plurality of wireless power reception apparatuses, and the plurality of wireless power reception apparatuses may be connected to one wireless power transmission end 10 to perform wireless charging.

In this case, the wireless power transmission end 10 may distribute and transmit power to the plurality of wireless power reception apparatuses using a time-division method without being limited thereto, and in another example, the wireless power transmission end 10 may distribute and transmit power to a plurality of wireless power reception apparatuses using different frequency bands allocated to respective wireless power reception apparatuses.

In this case, the number of wireless power reception apparatuses connectable to one wireless power transmission end 10 may be adaptively determined based on at least one of requested electric energy for respective wireless power reception apparatuses, a battery charging state, power consumption of an electronic device, or available electric energy of a wireless power transmission apparatus.

In another example, as shown in a reference numeral 200b, the wireless power transmission end 10 may include a plurality of wireless power transmission apparatuses.

In this case, the wireless power reception end 20 may be simultaneously connected to the plurality of wireless power transmission apparatuses, and may simultaneously receive power from the connected wireless power transmission apparatuses to perform charging.

In this case, the number of wireless power transmission apparatuses connected to the wireless power reception end 20 may be adaptively determined based on requested electric energy of the wireless power reception end 20, a battery charging state, power consumption of an electronic device, available electric energy of a wireless power transmission device, and the like.

Figure 3:
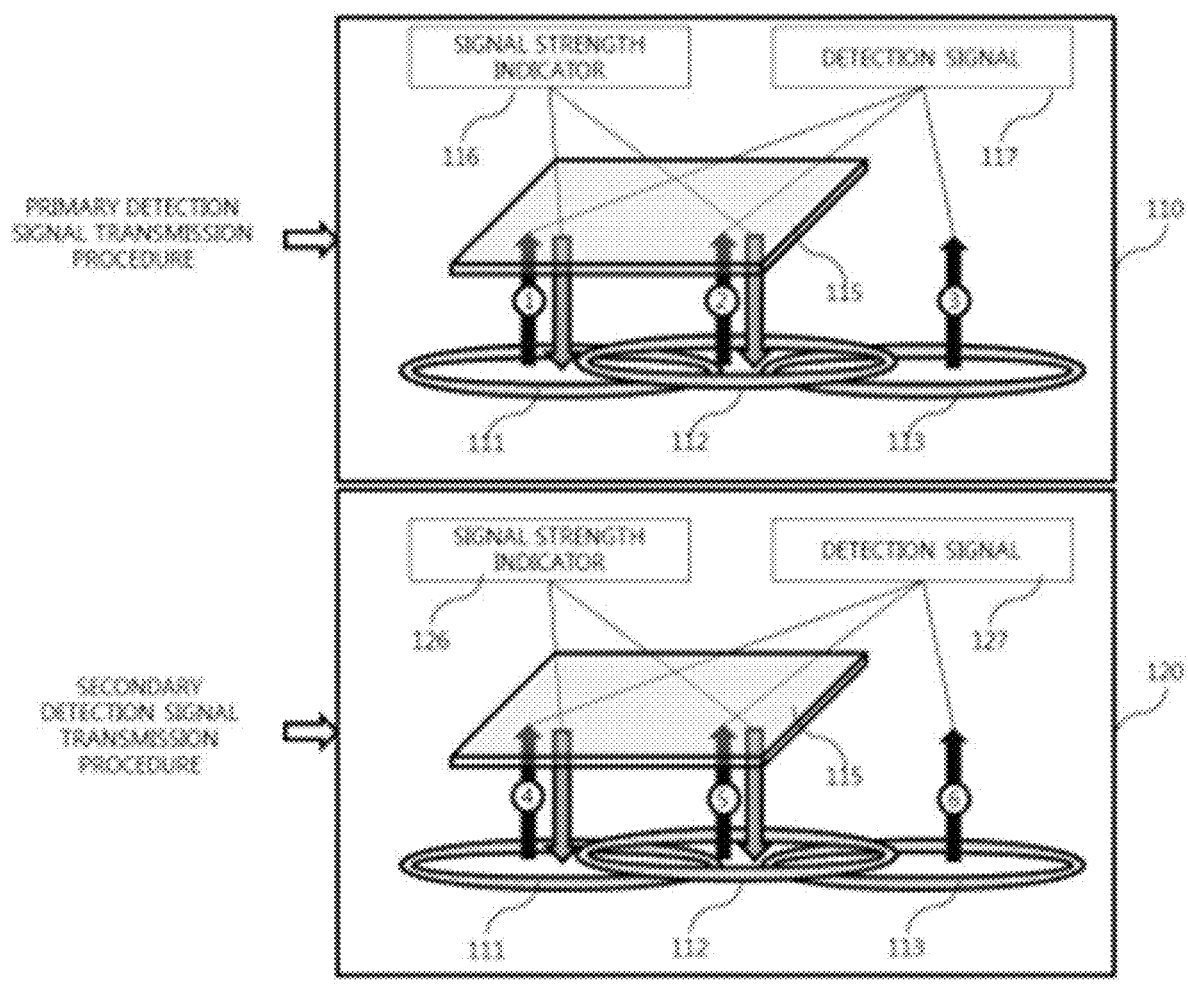
FIG. 3 is a diagram for explanation of a produce of transmitting a detection signal in a wireless charging system according to an embodiment.

FIG. 3 is a diagram for explanation of a produce of transmitting a detection signal in a wireless charging system according to an embodiment.

For example, three transmission coils 111, 112, and 113 may be installed in a wireless power transmitter. A partial region of each transmission coil may overlap another transmission coil, and a wireless power transmitter may sequentially transmit predetermined detection signals 117 and 127—for example, a digital ping signal—for detection of presence of a wireless power receiver through each transmission coil in a predefined order.

As shown in FIG. 3, the wireless power transmitter may sequentially transmit the detection signal 117 through a primary detection signal transmission procedure indicated by a reference numeral 110 and may identify the transmission coils 111 and 112 through which a signal strength indicator 116 is received from a wireless power receiver 115.

Then, the wireless power transmitter may sequentially transmit the detection signal 127 through a secondary detection signal transmission procedure indicated by a reference numeral 120, may identify a transmission coil with high power transmission efficiency (or transmission efficiency)— that is, an alignment state between a transmission coil and a reception coil-among the transmission coils 111 and 112 through which a signal strength indicator 126 is received, and may perform control to transmit power—that is, to perform wireless charging—through the identified transmission coil.

As shown in FIG. 3, the wireless power transmitter performs the detection signal transmission procedure twice in order to more accurately identify whether reception coils of the wireless power receiver are appropriately aligned in a transmission coil.

As shown in reference numerals 110 and 120 of FIG. 3, when a first transmission coil 111 and a second transmission coil 112 receive the signal strength indicators 116 and 126, the wireless power transmitter may select a transmission coil that is the most appropriately aligned based on the signal strength indicator 126 received by each of the first transmission coil 111 and the second transmission coil 112 and may perform wireless charging using the selected transmission coil.

Figure 4:
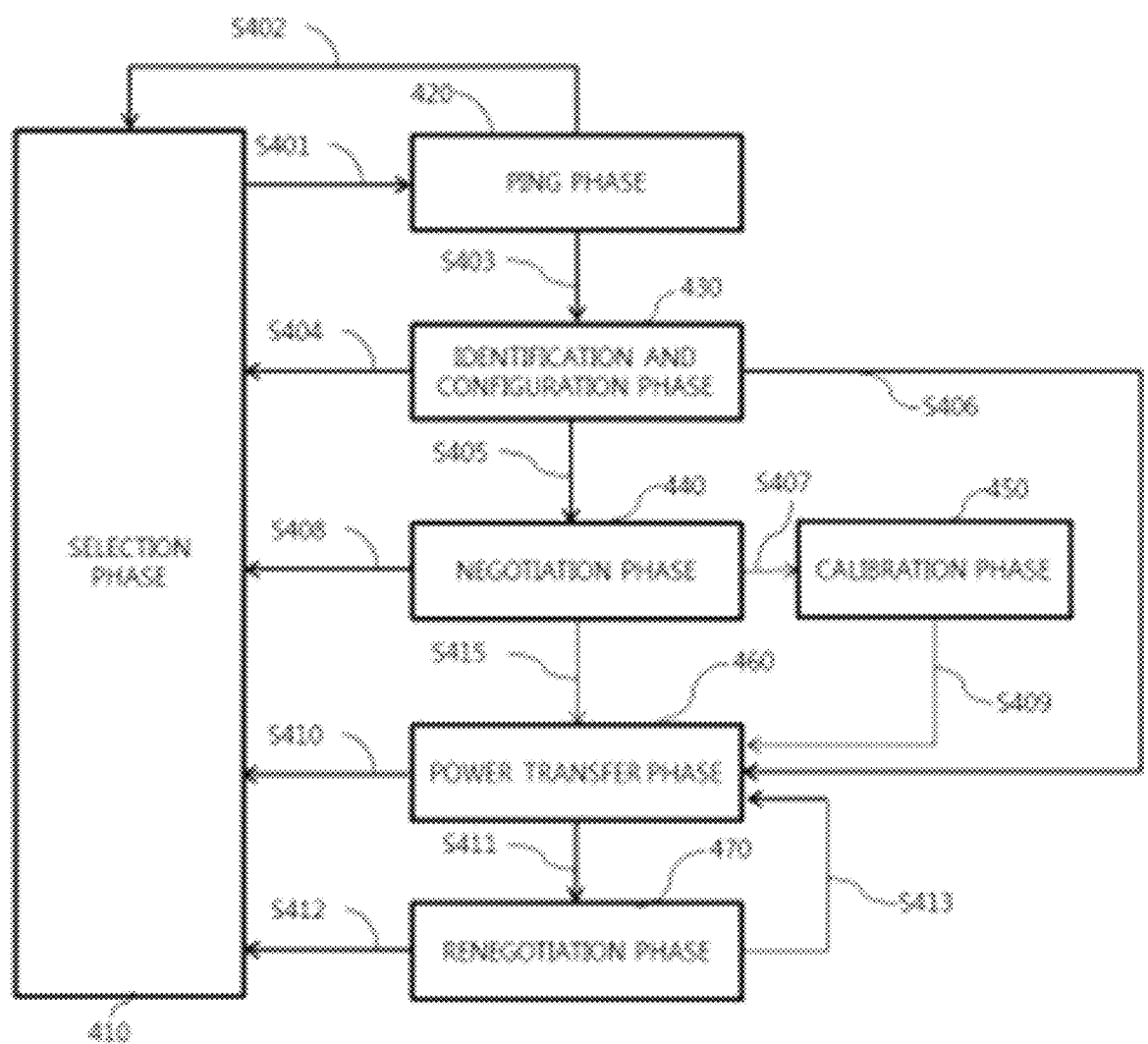
FIG. 4 is a state transition diagram for explanation of a wireless power transmission procedure according to an embodiment.

FIG. 4 is a state transition diagram for explanation of a wireless power transmission procedure according to an embodiment.

Referring to FIG. 4, power transmission to a receiver from a transmitter according to an embodiment may be broadly classified into a selection phase 410, a ping phase 420, an identification and configuration phase 430, a negotiation phase 440, a calibration phase 450, a power transfer phase 460, and a renegotiation phase 470.

The selection phase 410 may be a phase including—for example, S402, S404, S408, S410, and S412—which transitions when a specific error or a specific event is detected while power transmissions is started or power transmission is maintained.

Here, the specific error and the specific event would be obvious from the following description.

In addition, in the selection phase 410, the transmitter may monitor whether an object is present on an interface surface.

Upon detecting that the object is present on the interface surface, the transmitter may transition to the ping phase 420 (S403).

For example, in the selection phase 410, the transmitter may transmit an analog ping signal with a very short pulse and may detect whether an object is present in an active area of the interface surface based on a current change of a transmission coil (or a primary coil). Here, the active area may refer to an area in which a receiver is disposed to enable wireless charging.

In another example, in the selection phase 410, the transmitter may detect whether an object is present in an active area of an interface surface using a configured sensor.

For example, the sensor may include a hall sensor, a pressure sensor, a capacity sensor, a current sensor, a voltage sensor, a light detection sensor, and the like, and thereamong, the sensor may detect an object present in an active area through at least one sensor.

In the selection phase 410, upon detecting an object, the wireless power transmitter may measure a quality factor corresponding to a configured LC resonance circuit—for example, an LC resonant circuit including a coil (inductor) and a resonant capacitor that are connected in series to each other—.

Upon detecting an object in the selection phase 410, the transmitter according to an embodiment may measure a quality factor value in order to determine whether a wireless power receiver along with a foreign object (FO) is present in a charging area.

Here, the quality factor value may be measured prior to entrance into the ping phase 420. The quality factor value may be measured in the state in which power transmission through a transmission coil is temporally stopped.

For example, the quality factor value may be measured with respect to a predefined reference operation frequency.

In another example, the quality factor value may also be measured via sampling in units of predetermined frequencies in an operation frequency band used in wireless power transmission.

The transmitter according to an embodiment may check a frequency value corresponding to a quality factor value with a maximum value among quality factor values measured in the same frequency hand and may store the frequency value in a memory. Hereinafter, for convenience of description, a frequency at which a quality factor value in the same operation frequency band is highest is referred to as a quality factor peak frequency or is simply referred to as a peak frequency for convenience of description.

Distribution of the quality factor value measured to correspond to the operation frequency band and the quality factor peak frequency may be different depending on a type of a wireless power transmitter.

In particular, a quality factor value measured using a transmitter—hereinafter, a 'transmitter for authentication' for convenience of description—and an LCR meter used to authenticate a receiver with respect to the same operation frequency may be different from a quality factor value measured by a commercially available transmitter.

Upon receiving a signal strength packet, the wireless power transmitter may enter the identification and configuration phase 430 (S403).

When the identification and configuration phase is normally completed, the wireless power transmitter may enter the negotiation phase 440 (S405).

When the identification and configuration phase is normally completed, the wireless power transmitter may also enter the power transfer phase 460 depending on a type of a receiver (S406).

When the wireless power transmitter enters the negotiation phase 440, the wireless power transmitter may receive an FOD status packet including a reference quality factor value from the wireless power receiver.

The wireless power transmitter may determine a quality factor threshold value based on the received reference quality factor value.

Then, the wireless power transmitter may compare the measured quality factor value and the quality factor threshold value to determine whether a foreign object is present.

However, when a foreign object detection method of simply comparing a predetermined quality factor threshold value determined based on the reference quality factor value and a measured quality factor value to detect whether a foreign object is present is applied to a commercially available transmitter, the accuracy of detecting a foreign object may be lowered.

Here, the reference quality factor value may refer to a quality factor value at a reference operation frequency measured in the state in which a foreign object is not present in a charging region of a transmitter for authentication.

The reference quality factor value received by the negotiation phase 440 and a quality factor value-hereinafter, a 'current quality factor' for convenience of description-corresponding to a reference operation frequency measured prior to the ping phase 420 may be compared with each other to determine whether a foreign object is present.

However, a transmitter that measures the reference quality factor value—i.e., a transmitter for authentication—and a transmitter that measures the current quality factor value may be different from each other. Accordingly, the quality factor threshold value determined to determine whether a foreign object is present may not be accurate.

Accordingly, the transmitter according to an embodiment may receive a reference quality factor value corresponding to a type of the corresponding transmitter from a wireless power receiver and may also determine the quality factor threshold value based on the received reference quality factor value.

A transmission coil may have the inductance and/or series resistance component in the transmission coil which may decrease due to environmental change, thereby changing (shifting) the resonant frequency of the corresponding transmission coil. That is, a quality factor peak frequency as a frequency at which the maximum quality factor value is measured in the operating frequency band may be shifted For example, since the wireless power receiver includes a magnetic shield (shielding material) having high permeability, the high permeability may increase the inductance value measured in the transmission coil. In contrast, a foreign object, which is a metallic material, decreases the inductance value.

Generally, in the case of an LC resonant circuit, the resonant frequency f_resonant is calculated by $$\frac{1}{2\pi\sqrt{LC}}.$$

When only the wireless power receiver is placed in the charging area of the transmitter, the L value increases, and thus the resonant frequency decreases. That is, the resonant frequency is moved (shifted) to the left on the frequency axis.

In contrast, when a foreign object is placed in the charging area of the transmitter, the L value decreases, and thus the resonant frequency increases. That is, the resonant frequency is moved (shifted) to the right on the frequency axis.

The transmitter according to another embodiment may determine whether the foreign object placed in the charging area is present based on a change in the quality factor peak frequency.

The transmitter may acquire information on a preset quality factor peak frequency-hereinafter, a 'reference quality factor peak frequency pf_reference' or 'reference peak frequency' for convenience of description-corresponding to the corresponding transmitter type from the receiver or may maintain the information in a predetermined recording region.

Upon detecting that an objecting is placed in the charging area, the transmitter may measure a quality factor value in the operation frequency band prior to entrance into the ping phase 420 and may identify the quality factor peak frequency based on the measured result. Here, in order to distinguish the identified quality factor peak frequency from the reference quality factor peak frequency, the quality factor peak frequency may be referred to as a 'measured quality factor peak frequency pf_measured' or 'measured peak frequency'.

In the negotiation phase 440, the transmitter may determine whether the foreign object is present based on the reference quality factor peak frequency and the measured quality factor peak frequency.

When information on the reference quality factor peak frequency is received from the receiver, the information may be received through a predetermined packet in the identification and configuration phase 430 or the negotiation phase 440.

For example, the transmitter may transmit information on the transmission type thereof to the receiver in the identification and configuration phase 430. The receiver may read a pre-stored reference quality factor peak frequency corresponding to the received transmitter type information from a corresponding memory and may transmit information on the read reference quality factor peak frequency to the transmitter.

The transmitter according to another embodiment may determine whether the foreign object is present using both a foreign object detection method based on the quality factor peak frequency and a foreign object detection method based on the quality factor value. For example, If a difference between the reference quality factor value corresponding to a transmitter type and the measured quality factor is small, for example, if the difference is equal to or less than 10%, presence of the foreign object may be determined by comparing the reference peak frequency corresponding to the transmitter type with the measured quality factor peak frequency. In contrast, if the difference between the two quality factor values is greater than 10%, the transmitter may immediately determine that the foreign object is present.

According to another embodiment, upon determining that the quality factor threshold value determined based on the reference quality factor value corresponding to the transmitter type with the measured quality factor, the transmitter may also compare the reference quality factor peak frequency corresponding to the transmitter type with the measured quality factor peak frequency to determine whether the foreign object is present.

If it is difficult to detect the foreign object using the quality factor value, the transmitter may make a request to the identified receiver for information on the reference quality factor peak frequency corresponding to the corresponding transmitter type. Then, upon receiving information on the reference quality factor peak frequency from the receiver, the transmitter may determine whether the foreign object is present using the reference quality factor peak frequency and the measured quality factor peak frequency. As such, the transmitter may more accurately detect the foreign object placed in the charging area.

When the object is detected, the transmitter may enter the ping phase 420, may wake up the receiver, and may transmit a digital ping for identifying whether the detected object is a wireless power receiver.

In the ping phase 420, when a response signal to the digital ping, for example, a signal strength packet s not received from the receiver, the transmitter may transition to the selection phase 410 again.

In the ping phase 420, when a signal indicating that power transfer has been completed, that is, an end charging packet, is received from the receiver, the transmitter may transition to the selection phase 410.

When the ping phase 420 is completed, the transmitter may transition to the identification and configuration phase 430 for identifying the receiver and collecting the configuration and status information of the receiver.

In the identification and configuration phase 430, the transmitter may also transmit information on a transmitter type to the receiver.

In the identification and configuration phase 430, the receiver may make a request to the transmitter for information on the transmitter type, and the transmitter may also transmit the information on the transmitter type to the receiver according to the request of the receiver.

In the identification and configuration phase 430, when an unexpected packet is received, when an expected packet is not received during a predetermined time (timeout), when a packet transmission error occurs, or when power transfer contract is not established (no power transfer contract), the transmitter may transition to the selection phase 410.

The transmitter may determine whether entry into the negotiation phase 440 is necessary based on the negotiation field value of the configuration packet received in the identification and configuration phase 430.

As the check result, when negotiation is required, the transmitter may enter the negotiation phase 440 to perform a predetermined FOD procedure.

In contrast, as the check result, when negotiation is not required, the transmitter may immediately transition to the power transfer phase 460.

Upon checking that the corresponding wireless power receiver in the identification and configuration phase 430 is a receiver supporting only a first power transmission mode, the wireless power transmitter according to an embodiment may not perform the negotiation phase 440 and may immediately enter the power transfer phase 460.

The wireless power transmitter may enter the power transfer phase 460 and then may periodically perform a predetermined foreign object detection procedure.

The foreign object detection procedure may be a foreign object detection procedure based on the quality factor value without being limited thereto, and a foreign object detection procedure based on power loss may be applied.

A foreign object detection procedure based on power loss is a method of comparing a difference between transmission power of the wireless power transmitter and reception power of the wireless power receiver with a predetermined reference to determine whether the foreign object is present and a detailed procedure will be more obvious with reference to the following description of the drawings.

For example, in the negotiation phase 440, the transmitter may receive a FOD status packet including a reference quality factor value. In addition, the transmitter may receive the FOD status packet including a reference peak frequency value corresponding to the transmitter type.

In another example, in the negotiation phase 440, the transmitter may also receive a status packet including a reference quality factor value corresponding to the transmitter type and the reference peak frequency value. In this case, the transmitter may determine a quality factor threshold value for foreign object detection based on the reference quality factor value corresponding to the transmitter type.

The transmitter may also determine a quality factor peak frequency threshold value for foreign object detection based on the reference quality factor peak frequency value corresponding to the transmitter type.

The transmitter may compare the determined quality factor threshold value and (or) the determined quality factor peak frequency threshold value with the measured quality factor value—which indicates a quality factor value measured prior to the ping phase 420—and (or) a measured quality factor peak frequency value to detect a foreign object placed in the charging area.

The transmitter may control power transmission according to the foreign object detection result. For example, when the foreign object is detected, the transmitter may transmit a negative acknowledge packet (NACK) to the receiver in response to the FOD status packet. Accordingly, power transmission may be stopped without being limited thereto.

The transmitter may compare the determined quality factor peak frequency threshold value and the measured quality factor peak frequency value to detect the foreign object placed in the charging area. The transmitter may control power transmission according to the foreign object detection result. For example, when the foreign object is detected, the transmitter may transmit a negative acknowledge packet (NACK) to the receiver in response to a FOD status packet. Accordingly, power transmission may be stopped without being limited thereto.

When the foreign object is detected, the transmitter may receive an end of charge message from the receiver and may enter the selection phase 410 based on the end of charge message.

When the foreign object is detected in the negotiation phase 440, the transmitter according to another embodiment may enter the power transfer phase 460 (S415).

In contrast, when the foreign object is not detected, the transmitter may complete the negotiation phase 440 with respect to transmission power and may enter the power transfer phase 460 through the calibration phase 450 (S407 and S409).

In detail, when the foreign object is not detected, if the transmitter enters the calibration phase 450, the transmitter may determine the strength of the power received by a reception end and may measure power loss between a transmission end and a reception end in order to determine the intensity of power to be transmitted from the transmission end.

For example, the transmitter may determine reception power intensity of the receiver based on reception power intensity information fed back from the reception end during power transmission. That is, the transmitter may predict (or calculate) based on an intensity difference between transmission power at a transmission end and reception power at a reception end in the calibration phase 450.

In the power transfer phase 460, when an unexpected packet is received, when an expected packet is not received during a predetermined time (timeout), when predetermined power transfer contract violation occurs, or when charging is completed, the transmitter may transition to the selection phase 410 (S410).

In addition, in the power transfer phase 460, when the power transfer contract needs to be reconfigured according to transmitter state change, the transmitter may transition to the renegotiation phase 470 (S411). In this case, when renegotiation is normally completed, the transmitter may return to the power transfer phase 460 (S413).

The power transfer contract may be configured based on the transmitter and receiver status information and characteristic information. For example, the transmitter status information may include information on the maximum amount of transmittable power, information on the maximum number of receivable receivers, etc. and the receiver status information may include information on required power.

The wireless power transmitter according to an embodiment may be operated based on any one of a first power transfer mode and a second power transfer mode based on guaranteed power requested by the wireless power receiver.

The wireless power transmitter according to another embodiment may be operated based on any one of the first power transfer mode and the second power transfer mode based on the determination result about whether the foreign object is present.

The wireless power receiver connected to the wireless power transmitter may be a receiver that supports only the first power transfer mode or a receiver that supports both the first power transfer mode and the second power transfer mode.

Here, guaranteed power to be set in the second power transfer mode may be greater than guaranteed power to be set in the first power transfer mode.

For example, the guaranteed power to be set in the first power transfer mode may be first power—for example, 5 W or less—and the guaranteed power to be set in the second power transfer mode may be greater than the first power and may be less than second power—for example, 15 W—.

Figure 5:
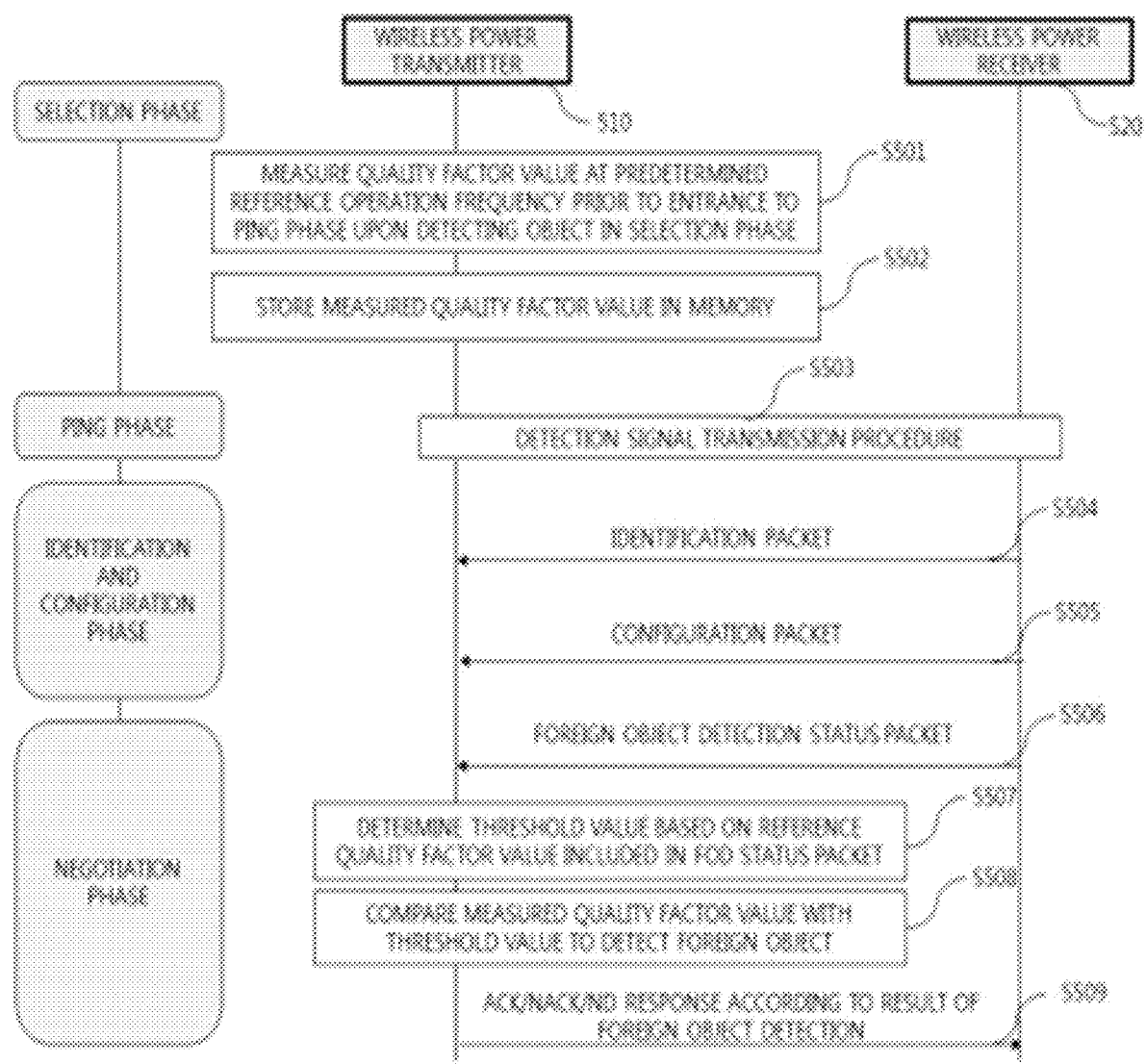
FIG. 5 is a flowchart for explanation of a foreign object detection procedure in a wireless power transmission system according to an embodiment.

FIG. 5 is a flowchart for explanation of a foreign object detection procedure in a wireless power transmission system according to an embodiment.

In detail, FIG. 5 is a diagram for explanation of a foreign object detection procedure in a second power transfer mode.

Referring to FIG. 5, when an object is detected in a selection phase, a wireless power transmitter 510 may measure a quality factor value at a predetermined reference operation frequency prior to entrance to a ping phase (S501). Here, the reference operation frequency may be a resonant frequency without being limited thereto. The wireless power transmitter 510 may store the measured quality factor value in an internal memory (S502).

The wireless power transmitter 510 may enter a ping phase and may perform the detection signal transmission procedure described above with reference to FIG. 3 (S503).

When a wireless power receiver 520 is detected, the wireless power transmitter 510 may enter an identification and configuration phase to receive an identification packet and a configuration packet (S504 and S505).

The wireless power transmitter 510 may enter a negotiation phase and may receive a FOD status packet from the wireless power receiver 520 (S506). Here, the FOD status packet may include a reference quality factor value.

The wireless power transmitter 510 may determine a threshold value for determining whether the foreign object is present based on the reference quality factor value included in the FOD status packet (S507).

For example, the threshold value may be determined as a value that is less than the reference quality factor value by a predetermined ratio.

The wireless power transmitter 510 may compare the measured quality factor value with the determined threshold value to detect a foreign object (S508). Here, when the measured quality factor value is less than the threshold value, the wireless power transmitter 510 may determine that the foreign object is present in the charging area.

The wireless power transmitter 510 may transmit an ACK response, a NACK response, or a no decision (ND) response to the wireless power receiver 520 according to the detection result of the foreign object (S509).

When the wireless power receiver 520 receives the NACK response or the ND response from the wireless power transmitter 510, the wireless power receiver 520 may be controlled not to supply power with predetermined intensity or greater to an electronic device (or a battery/load) through an output terminal thereof until power transmission by the wireless power transmitter 510 is completely stopped.

Here, the power with predetermined intensity or greater may be 5 W as a reference without being limited thereto, and may be differently defined according to a design of one of ordinary skill in the art and an electronic device having the wireless power receiver 520 installed therein (or a battery/load connected to the wireless power receiver 520).

Figure 6:
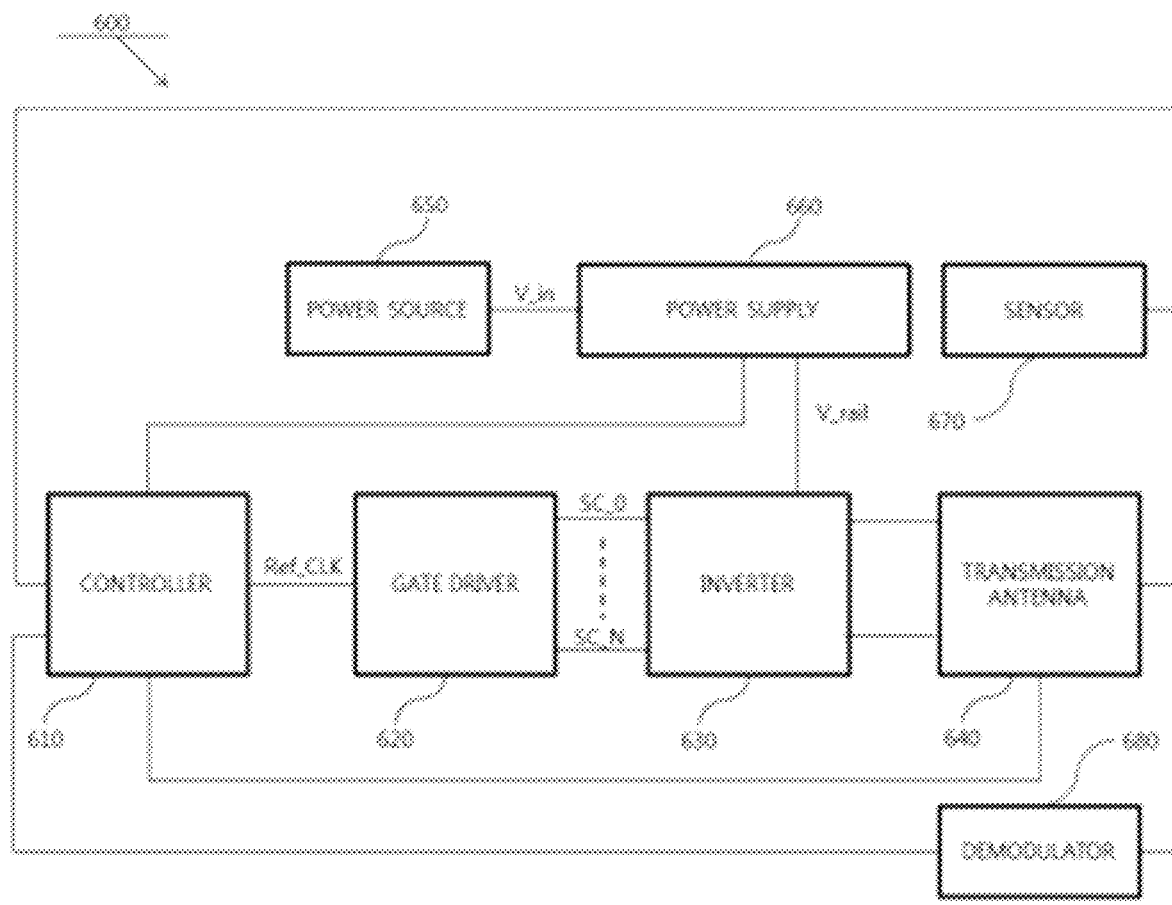
FIG. 6 is a block diagram for explanation of the structure of a wireless power transmission apparatus according to an embodiment.

FIG. 6 is a block diagram for explanation of the structure of a wireless power transmission apparatus according to an embodiment.

Referring to FIG. 6, a wireless power transmission apparatus 600 may include a controller 610, a gate driver 620, an inverter 630, a transmission antenna 640, a power source 650, a power supply 660, a sensor 670, and a demodulator 680.

The power supply 660 may convert DC current or AC current applied from the power source 650 and may provide the same to the inverter 630. Hereinafter, for convenience of description, a voltage supplied to the inverter 630 from the power supply 660 will be referred to as an inverter input voltage or V_rail.

The power supply 660 may include at least one of an AC/DC converter or a DC/DC converter depending on a type of power applied from the power source 650.

For example, the power supply 660 may be a switching mode power supply (SMPS) and may use a switching control method of converting AC power into DC power using a switching transistor, a filter, a rectifier, and the like. Here, the rectifier and the filter may be independently configured and may be placed between the AC power source and the SMPS.

The SMPS may be a power supply that controls an on/off time ratio of a semiconductor switch device to supply DC power with stabilized output to a corresponding device or a circuit device and is capable of having high efficiency, being miniaturized, and being lightweight, and thus has been widely used in most of electronic devices and equipment.

The stability and precision of an electronic circuit operation may be mostly dependent upon the quality of a power source. In general, a method of converting stable power from a battery and commercially available AC power and supplying the power may be broadly classified into a series regulator method and a switched mode method.

The series regulator method used in a TV set, a CRT monitor, or the like has simple and inexpensive surrounding circuits but the circuits disadvantageously generate a large amount of heat, have low power efficiency, and have a large volume.

In contrast, the switched mode method is advantageous that heat is barely generated, power efficiency is high, and a circuit volume is small, but is disadvantageous that circuits are expensive and complex and interfere with output noise in terms of electromagnetic waves due to high-frequency switching.

In another example, the power supply 660 may be a variable switching mode power supply (SMPS). The variable SMPS may switch and rectify an AC voltage in a band of a several tens of Hz output from an AC power supply to generate a DC voltage.

The variable SMPS may output a DC voltage in a predetermined level or may also adjust an output level of the DC voltage according to predetermined control of a Tx controller. The variable SMPS may control a supply voltage according to an output power level of a power amplifier—that is, the inverter 630—and may maintain maximum efficiency in all output levels to allow a power amplifier of the wireless power transmitter to always operate in a saturated region with high efficiency.

When a commercially available SMPS that is generally used is used instead of the variable SMPS, the variable DC/DC converter may be additionally used. The commercially available SMPS and the variable DC/DC converter may control a supply voltage according to an output power level of a power amplifier and may maintain the maximum efficiency in all output levels to ally the power amplifier to operate in a saturated region with high efficiency. According to an embodiment, the power amplifier may use a Class E type without being limited thereto.

The inverter 630 may convert a DC voltage V_rail in a predetermined level into an AC voltage to generate AC power to be wirelessly transmitted, according to a switching pulse signal—that is, a pulse width modulated signal—in a band of several MHz to several tens of MHz, received through the gate driver 620.

In this case, the gate driver 620 may generate a plurality of PWM signals SC_0 to SC_N for control of a plurality of switches included in the inverter 630 using a reference clock Ref_CLK signal supplied from the controller 610.

Here, when the inverter 630 includes a half bridge circuit, N may be 1, and when the inverter 630 includes a full bridge circuit, N may be 3, without being limited thereto, and different numbers of PWM signals for each inverter type may be supplied depending on a design type of the inverter 630.

For example, in the embodiment of FIG. 6, when the inverter 630 includes a full bridge circuit including four switches, the inverter 630 may receive four PWM signals SC_0, SC_1, SC_2, and SC_3 for control of the respective switches from the gate driver 620.

In contrast, in the embodiment of FIG. 6, when the inverter 630 includes a half bridge circuit including two switches, the inverter 630 may receive second PWM signals SC_0 and SC_1 for control of the respective switches from the gate driver 620.

The transmission antenna 640 may include at least one power transmission antenna (not shown)—for example, an LC resonant circuit—for wirelessly transmitting an AC power signal received from the inverter 630 and a matching circuit (not shown) for impedance matching.

When the transmission antenna 640 includes a plurality of transmission coils, the transmission antenna 640 may further include a coil selection circuit (not shown) for selection of a transmission coil to be used in wireless power transmission among a plurality of transmission coils.

The sensor 670 may include various sensing circuits for measuring intensity of the power/voltage/current input from the inverter 630 or (and) intensity of the power/power/voltage/current flowing in a transmission coil included in the transmission antenna 640, temperature and temperature change in a specific position inside the wireless power transmitter—e.g., which includes a transmission coil, a charging bed, a control circuit board, or the like—, and the like. Here, information sensed by the sensor 670 may be transmitted to the controller 610.

The sensor 670 may measure intensity of current flowing in the transmission coil while an analog ping is transmitted in the selection phases 410 and 510 and may transmit the intensity of current to the controller 610. The controller 610 may compare intensity information of current flowing in the transmission coil in the selection phase with a predetermined reference to detect whether an object placed in the charging area is present.

When the wireless power transmitter 600 performs in-band communication with the wireless power receiver, the wireless power transmitter 600 may include the demodulator 680 connected to the transmission antenna 640.

The demodulator 680 may demodulate an amplitude-modulated in-band and may transmit the signal to the controller 610.

For example, the controller 610 may check whether a signal strength indicator corresponding to a transmitted digital ping is received, based on the demodulated signal received from the demodulator 680.

Upon detecting an object placed in the charging area in the selection phase 410, the controller 610 may enter the ping phase 420 and may perform control to transmit a digital ping through the transmission antenna 640.

Upon detecting the object placed in the charging area in the selection phase 410, the controller 610 may temporally stop power transmission and may measure a quality factor value prior to entrance into the ping phase. Here, the measured quality factor value may be maintained in a predetermined memory (not shown) included in the wireless power transmitter 600.

Upon checking that the signal strength indicator is received in the ping phase, the controller 610 may stop transmitting the digital ping and may enter the identification and configuration phase 430 to receive the identification packet and the configuration packet.

Upon receiving an end power transfer packet after entrance into the power transfer phase 460, the controller 610 may stop power transmission and may enter the selection phase 410.

When the foreign object is present in the charging area, the controller 610 may stop power transmission and may enter the selection phase 410.

According to an embodiment, the controller 610 may calculate (or estimate) power loss on a wireless power transmission path based on the signal strength packet received from the wireless power receiver. The controller 610 may determine whether the foreign object is present based on the calculated (or estimated) power loss.

According to another embodiment, the controller 610 may measure a temperature change based on temperature sensing information received from the sensor 670 or temperature measurement information received from the wireless power receiver. The controller 610 may also determine whether the foreign object is present based on the measured temperature change.

According to another embodiment, the controller 610 may also perform a procedure of estimating power loss and determining whether the foreign object is present based on the temperature change according to a determination result of whether the foreign object is present based on the estimated power loss.

According to another embodiment, the controller 610 may also perform a procedure of determining whether the foreign object is present based on power loss according to determination result of whether the foreign object is present based on a temperature change.

According to the disclosure, upon receiving an FOD status packet in the negotiation phase 440, the controller 610 may determine a threshold value for foreign object detection based on the received FOD status packet and may also determine whether the foreign object is present based on the determined threshold value.

Here, the FOD status packet may include at least one of a reference quality factor value, a resonant frequency, or a quality factor value at the resonant frequency.

Upon receiving an end power transfer packet including a ripping code or an overheating code through the demodulator 680 in the power transfer phase 460, the controller 610 may stop power transmission and may enter the selection phase 410 to drive a ripping timer.

The controller 610 may suppress analog ping transmission and beep signal output until the driven ripping timer expires. Then, when the ripping timer expires, the controller 610 may enter the ping phase 420 and may perform control to transmit the digital ping through the transmission antenna 640.

Upon receiving an end power transfer packet including the ripping code or the overheating code after identification and configuration are completed on the detected receiver, the controller 610 may reset a ripping time and then may return to the selection phase 410.

According to an embodiment, an operation mode of the wireless power transmitter 600 may include a first power transfer mode and a second power transfer mode.

The controller 610 may be operated in any one of the first power transfer mode and the second power transfer mode based on the determination result of whether the foreign object is present in the negotiation phase 440.

Here, guaranteed power in the second power transfer mode may be greater than guaranteed power (or maximum transmission power) in the first power transfer mode.

For example, the guaranteed power in the first power transfer mode may be 5 W—hereinafter, referred to as first power—and the guaranteed power in the second power transfer mode may be 15 W—hereinafter, referred to as second power—.

In another example, the guaranteed power in the first power transfer mode may be 5 W and the guaranteed power in the second power transfer mode may be a value between the first power and the second power without being limited thereto, and it may be noted that guaranteed power corresponding to each operation mode is differently set according to a design of one of ordinary skill in the art.

When the foreign object is present as the determination result of whether the foreign object is present in the negotiation phase 440, the controller 610 may change a level of the guaranteed power from a second level corresponding to the second power transfer mode to a first level corresponding to the first power transfer mode.

That is, upon determining that the foreign object is present in the negotiation phase 440, the controller 610 may downward-adjust the guaranteed power. As such, a device may be prevented from being damaged due to overheating by the foreign object during transmission of high power.

Upon entering the first power transfer mode, the controller 610 may perform control not to perform the calibration phase 450 of FIG. 4 above.

Even if the foreign object is present in the charging area, when the calibration phase 450 is performed in the first power transfer mode, there is a problem in that the accuracy of the foreign object detection method based on power loss is lowered.

In general, the calibration phase 450 is a procedure performed assuming that the foreign object is not present. Accordingly, even if the foreign object is present in the charging area, when the calibration phase 450 is performed, there is a problem in that the accuracy of the foreign object detection method based on power loss is lowered, and thus the method is not reliable.

After entrance into the first power transfer mode, when the foreign object is not detected through the foreign object detection method based on power loss and (or) the foreign object detection method based on a temperature change, the controller 610 may enter the renegotiation phase 470 of FIG. 4.

When the power transfer contract is established according to the renegotiation with the wireless power receiver, the controller 610 may also change an operation mode according to the established power transfer contract.

For example, the power transfer contract may include guaranteed power, and the controller 610 may change and set guaranteed power through the renegotiation procedure with the wireless power receiver.

According to the renegotiation result, when guaranteed power requested by the wireless power receiver is changed to second guaranteed power corresponding to the second power transfer mode from the first guaranteed power corresponding to the first power transfer mode, the controller 610 may change the operation mode to the second power transfer mode from the first power transfer mode.

As described in the above embodiment, even if a foreign object is not actually present, when the wireless power transmitter 600 according to the disclosure determines that the foreign object is present, continuous charging may be advantageously performed.

In detail, even if a foreign object is not actually present during an initial operation in the second power transfer mode, when the wireless power transmitter 600 determines that the foreign object is present, the wireless power transmitter 600 may not immediately stop charging but instead may change a power transmission mode to the first power transfer mode from the second power transfer mode to maintain charging.

For example, even if the wireless power receiver is placed in the charging area without a foreign object, the wireless power transmitter 600 may determine that the foreign object according to an alignment status between the transmission coil and the reception coil.

The wireless power transmitter 600 according to the disclosure may also perform an additional foreign object detection procedure after the change to the first power transfer mode is performed, and thus it may be advantageous that the foreign object may be more accurately detected. Here, the additional foreign object detection procedure may include at least one of the foreign object detection procedure based on power loss or the foreign object detection procedure based on a temperature change.

Figure 7:
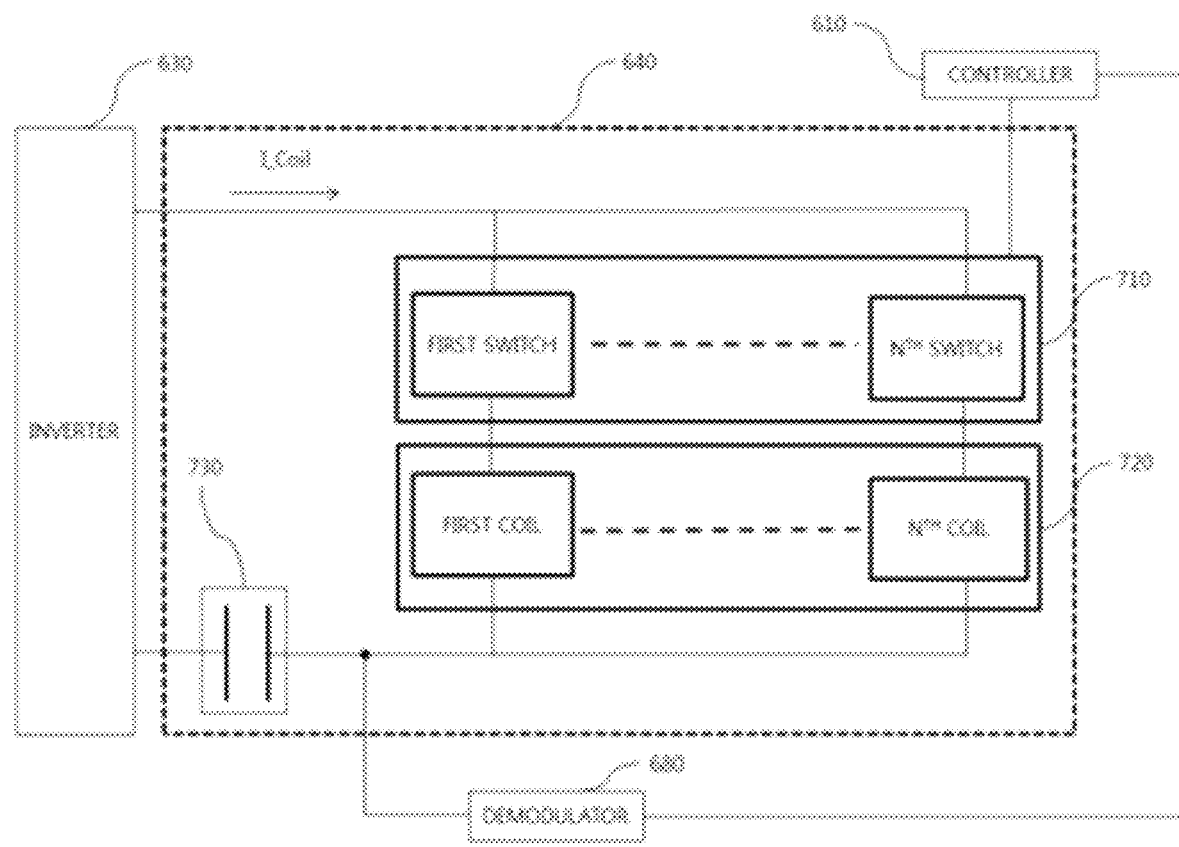
FIG. 7 is a diagram for explanation of the configuration of the transmission antenna of FIG. 6 according to an embodiment.

FIG. 7 is a diagram for explanation of the configuration of the transmission antenna of FIG. 6 according to an embodiment.

Referring to FIG. 7, the transmission antenna 640 may include a coil selection circuit 710, a coil assembly 720, and a resonant capacitor 730.

The coil assembly 720 may include at least one transmission coil—that is, first to Nth coils—.

The coil selection circuit 710 may include a switching circuit configured to transmit output current I_coil of the inverter 630 to any one or at least one of transmission coils included in the coil assembly 720.

For example, the coil selection circuit 710 may include first to Nth switches with one end connected to an output end of an inverter and the other end connected to a corresponding coil.

The first to Nth coils included in the coil assembly 720 may have one end connected to a corresponding switch of the coil selection circuit 710 and the other end connected to the resonant capacitor 730.

The demodulator 680 may demodulate a signal between the coil assembly 720 and the resonant capacitor 730—here, the signal is an amplitude-modulated signal—and may transmit the demodulated signal to the controller 610.

Figure 8:
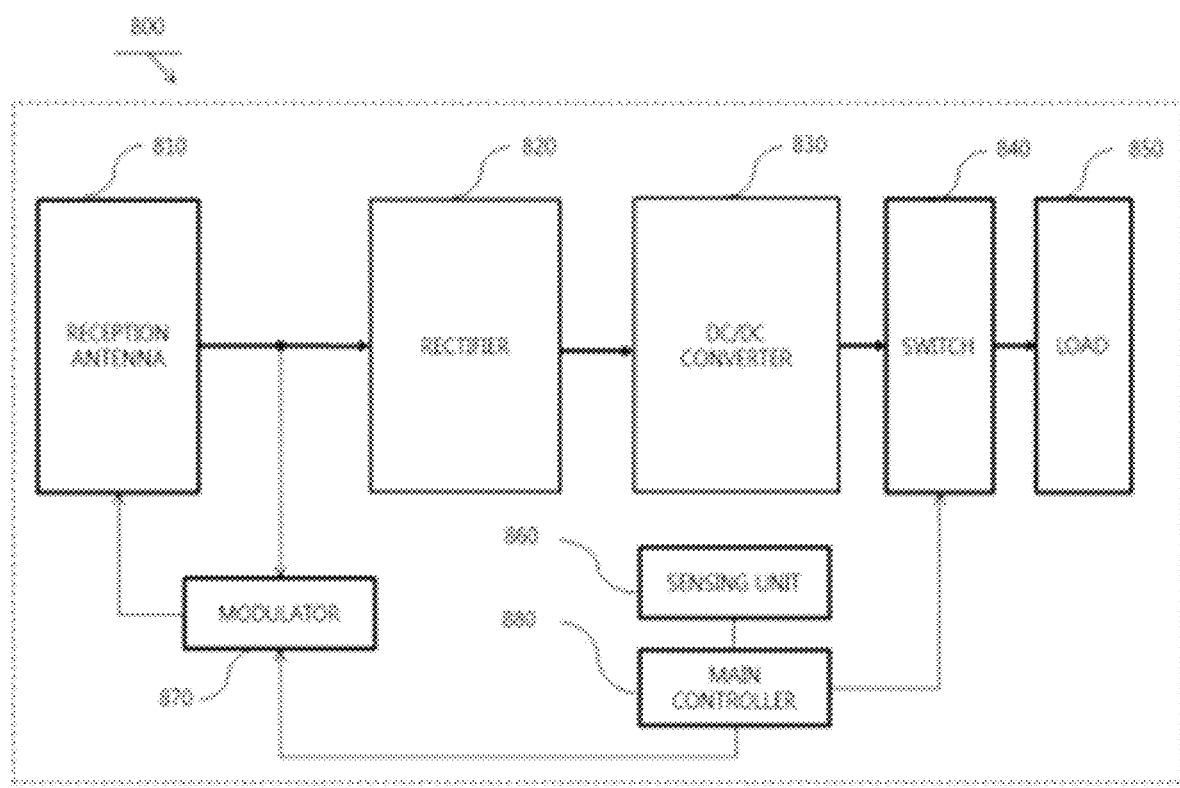
FIG. 8 is a block diagram illustrating the structure of a wireless power transmission apparatus that is operatively associated with the wireless power transmission apparatus of FIG. 6 according to an embodiment.

FIG. 8 is a block diagram illustrating the structure of a wireless power transmission apparatus that is operatively associated with the wireless power transmission apparatus of FIG. 6 according to an embodiment.

Referring to FIG. 8, a wireless power receiver 800 may include a reception antenna 810, a rectifier 820, a DC/DC converter 830, a switch 840, a load 850, a sensing unit 860, a modulator 870, and a main controller 880.

The wireless power receiver 800 shown in the example of FIG. 8 may exchange information with a wireless power transmitter via in-band communication.

The reception antenna 810 may include an inductor and at least one capacitor.

AC power transmit by the wireless power transmitter 600 may be transferred to the rectifier 820 through the reception antenna 810. The rectifier 820 may convert the AC power received through the reception antenna 810 into DC power and may transmit the DC power to the DC/DC converter 830.

The DC/DC converter 830 may convert the strength of the DC power output from the rectifier 820 into a specific strength required by the load 850.

The sensing unit 860 may measure the strength of the DC power output from the rectifier 820 and may provide the measured result to the main controller 880.

The main controller 880 may perform power control based on the output DC power of the rectifier 820.

The sensing unit 860 may measure the strength of current applied to the reception antenna 810 according to wireless power reception and may transmit the measured result to the main controller 880.

In addition, the sensing unit 860 may measure the internal temperature of the wireless power receiver 800 or an electronic device having the wireless power receiver 800 installed therein and may provide the measured temperature value to the main controller 880.

For example, the main controller 880 may compare the strength of the DC power output from the rectifier with a predetermined reference value and determine whether overvoltage occurs. As the determination result, upon determining that overvoltage occurs, the main controller 880 may transmit a predetermined packet indicating that overvoltage has occurred to the wireless power transmitter 600 through the modulator 870.

Upon receiving a packet from the main controller 880, the modulator 870 may generate an amplitude modulate signal corresponding to the received packet using AC power received through the reception antenna 810 and an included switch. In this case, the wireless power transmitter 600 may demodulate the signal that is amplitude-modulated by the wireless power receiver 800, through the included demodulator 680.

For example, upon receiving the signal strength packet from the main controller 880 in the ping phase, the modulator 870 may amplitude-modulate the digital ping received through the reception antenna 810 according to the received signal strength packet.

The modulator 870 according to an embodiment may include a modulation switch configured to amplitude-modulate the AC power signal received through the reception antenna 810. In this case, the main controller 880 may transmit a pulse width modulation signal corresponding to a transmission target packet to the modulator 870 and may directly control the modulation switch.

When intensity of output DC power of the rectifier is equal to or greater than a predetermined reference, the main controller 880 may determine that the detection signal—for example, a digital ping—is received, and upon receiving the detection signal, the main controller 880 may control perform control to transmit the signal strength packet corresponding to the corresponding detection signal to the wireless power transmitter through the modulator 870.

For example, when internal temperature is greater than a predetermined reference, the main controller 880 may control the switch 840—for example, switch OFF—not to transmit output DC power of the DC/DC converter 830 to the load 850. In this case, the main controller 880 may transmit a power transfer stop packet including the overheating code to the wireless power transmitter 600 through the modulator 870.

In another example, the main controller 880 may be operatively associated with a power management device—for example, a power management IC (PMIC)—configured to control internal power of an electronic device having the wireless power receiver 800 installed therein.

In this case, the output DC power of the DC/DC converter 830 may be transmitted to the power management device through the switch 840 and the power management device may control battery charging and power supply from an internal component of an electronic device.

The power management device may provide battery charging status information to the main controller 880. The main controller 880 may determine whether charging is performed based on the battery charging status information and internal temperature information.

When the wireless power receiver 800 according to an embodiment enters the negotiation phase 440, the wireless power receiver 800 may generate the FOD status packet and may transmit the same to the wireless power transmitter 600.

For example, the FOD status packet may include a reference quality factor value.

In another example, a foreign object detection packet may include a reference quality factor value and a resonant frequency corresponding to the corresponding wireless power receiver.

In another example, the foreign object detection packet may include a resonant frequency and a quality factor corresponding to the resonant frequency.

The wireless power transmitter 600 may determine a predetermined threshold value for determining whether the foreign object is present based on the reference quality factor value included in the FOD status packet.

The wireless power receiver 800 according to the above embodiment shown in FIG. 8 may further include a demodulator (not shown) configured to demodulate a packet transmitted by the wireless power transmitter 600.

As such, the wireless power transmitter 600 and the wireless power receiver 800 may perform bi-directional communication. According to an embodiment, bi-directional communication may be time-division communication in which the packet transmittable time in the wireless power transmitter and packet transmittable time in the wireless power receiver are distinguished from each other without being limited thereto.

Figure 9:
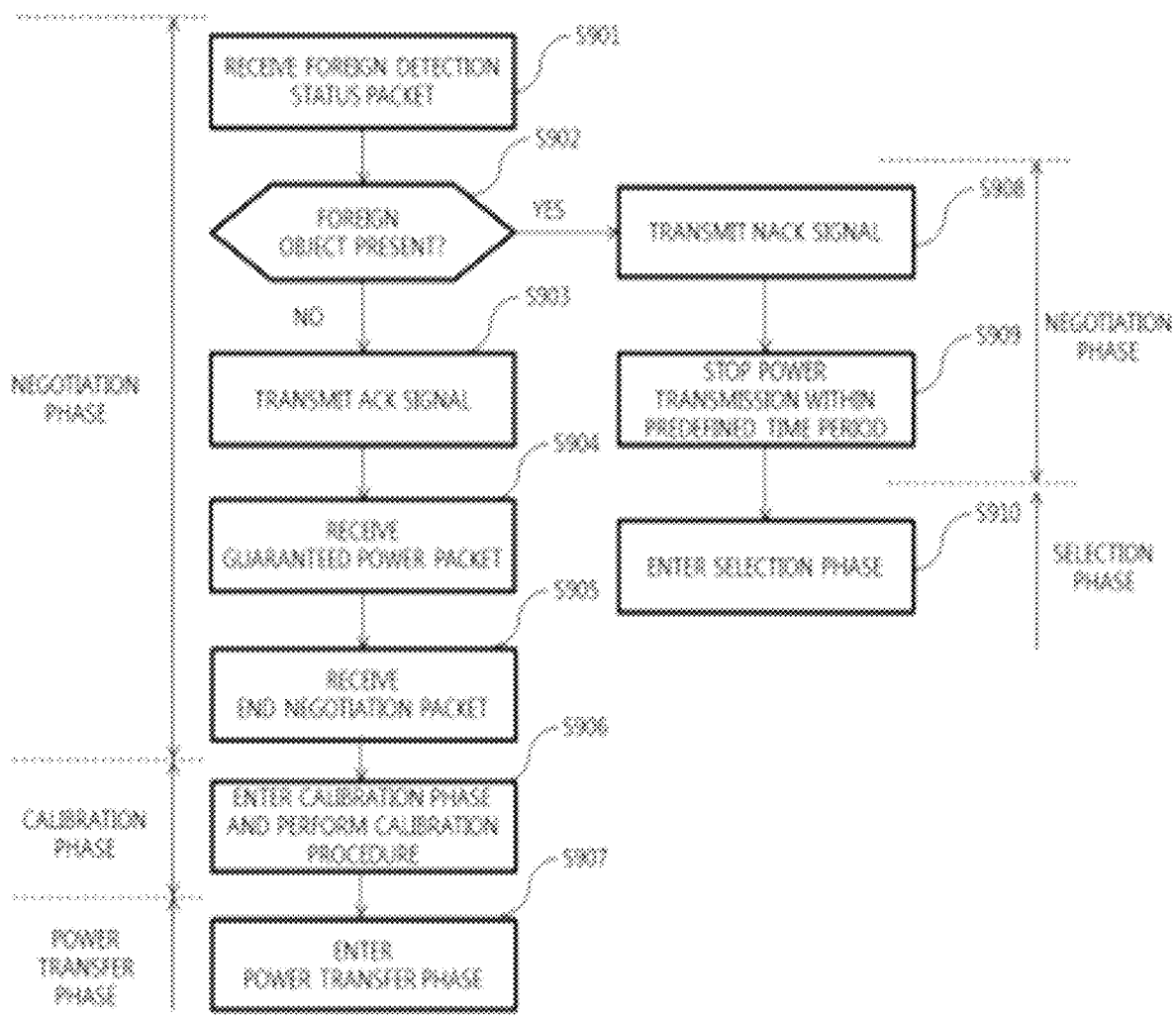
FIG. 9 is a diagram for explanation of a method of controlling power transmission according to whether a foreign object is detected by a conventional wireless power transmitter.

FIG. 9 is a diagram for explanation of a method of controlling power transmission according to whether a foreign object is detected by a conventional wireless power transmitter.

Upon receiving a negotiation request packet from a wireless power receiver, the wireless power transmitter may transmit a grant packet to enter the negotiation phase 440.

Referring to FIG. 9, in the negotiation phase 440, the wireless power transmitter may receive an FOD status packet from the wireless power receiver (S901).

Figure 10:
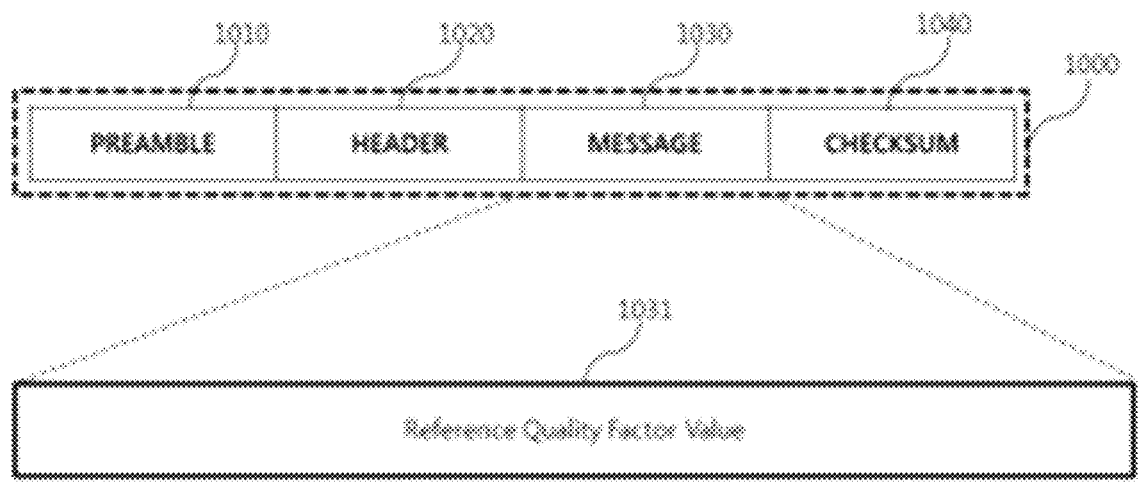
FIG. 10 is a diagram for explanation of a packet according to an embodiment.

For example, as shown in FIG. 10, the wireless power transmitter may receive the FOD status packet having a reference quality factor value 1031 in the message 1030 field.

The wireless power transmitter may determine whether the foreign object is present (S902). Here, the wireless power transmitter may detect an object in the selection phase 410 and may then compare a quality factor value measured prior to entrance into the ping phase 420 and a quality factor threshold value determined based on the reference quality factor value received in the negotiation phase 440 to determine whether the foreign object is present.

In the following embodiment, a foreign object detection method will be exemplified as a foreign object detection method after entrance into the negotiation phase 440, but this is merely an embodiment and it may be noted that different methods are applied as a foreign object detection method in the negotiation phase according to a design of one of ordinary skill in the art or standard definition.

As the determination result, when the foreign object is not present, the wireless power transmitter may transmit an ACK signal to the corresponding wireless power receiver (S903).

Then, the wireless power transmitter may receive a guaranteed power packet including information on guaranteed power requested by the wireless power receiver (S904).

The wireless power transmitter may receive the end negotiation packet from the wireless power receiver (S905).

Upon receiving the end negotiation packet, the wireless power transmitter may enter the calibration phase 450 from the negotiation phase 440.

The wireless power transmitter may enter the calibration phase 450 to perform a predetermined calibration procedure (S906).

When the power transfer contract is completed through the calibration procedure, the wireless power transmitter may enter the power transfer phase 460 and may begin charging (S907).

As the determination result of operation 902, when the foreign object is present, the wireless power transmitter may transmit a NACK signal in response to the FOD status packet (S908).

Upon receiving the NACK signal in response to the FOD status packet, the wireless power receiver may perform control to prevent power at an output end thereof from exceeding a predetermined reference—for example, 5 W without being limited—until a power signal received from the wireless power transmitter is completely removed.

The wireless power transmitter may stop power transmission within a predefined time—for example, 5 seconds—after the NACK signal is transmitted (S909).

When power transmission is stopped, the wireless power transmitter may enter the selection phase 410 (S910).

When power corresponding to the second power transfer mode is transmitted in the state in which the foreign object is placed in the charging area, this may increase heating riskiness of a device.

Accordingly, upon determining that the foreign object is present, the conventional wireless power transmitter may block entrance into the power transfer phase 460, may stop power transmission within a predefined time, and may then enter the selection phase 410.

However, even if a foreign object is not actually present, the wireless power transmitter may incorrectly determine that the foreign object is present because of measurement error of an LCR meter included in the wireless power transmitter, quality factor cross calibration error due to a device design of the wireless power transmitter and the wireless power receiver and a design difference of coils installed therein, a distance between the transmission coil and the reception coil—that is, Z distance—a position of the wireless power receiver placed in the charging area—that is, XY displacement—, and the like.

Even if a foreign object is not actually present, when power transmission is unconditionally stopped and then returns to the selection phase, a user may go through serious inconvenience.

In particular, a wireless power receiver applied to a smartphone or the like may use a shielding material with high permeability in order to reduce the thickness of a corresponding product and may be designed to minimize the thickness of the reception coil.

In this case, resistance R may be remarkably increased and the quality factor Q may be remarkably reduced. When a housing formed of a metallic material is applied to the corresponding product, the quality factor Q may be further lowered.

This may increase error probability of determination of whether the foreign object is present in the wireless power transmitter.

For example, the case in which error of determination of whether the foreign object is present occurs may include a situation in which the quality factor Q is measured to be low and the foreign object is determined to be present even if a smartphone is placed in the charging area, a situation which a smartphone as well as the foreign object is placed in the charging area, and the like.

Accordingly, there is a need for a method of controlling power transmission for minimizing user convenience while preventing a device from being damaged due to overheating in order to overcome the above conventional problem.

FIG. 10 is a diagram for explanation of a packet according to an embodiment.

The wireless power transmission end 10 and the wireless power reception end 20 according to an embodiment may exchange a packet through in-band communication, but this is merely one embodiment, and the corresponding packet may also be exchanged through out-of-band communication.

Referring to FIG. 10, a packet format 1000 used for information exchange between the wireless power transmission end 10 and the wireless power reception end 20 may include a preamble 1010 field for acquiring synchronization for demodulation of the corresponding packet and identifying an accurate start bit of the corresponding packet, a header 1020 field for identifying the type of a message included in the corresponding packet, a message 1030 field for transmitting the content (or payload) of the corresponding packet, and a checksum 1040 field for identifying whether an error has occurred in the corresponding packet.

A packet reception end may identify the size of the message 1030 included in the corresponding packet based on the value of the header 1020.

A type of a packet to be transmitted for each operation of FIG. 4 above may be defined according to values of the header 1020, and some values of the header 1020 may be commonly defined in different operations of a wireless power transmission procedure. For example, in the ping phase 420 and the power transfer phase 460, an end power transfer packet for stopping power transmission of the wireless power transmitter may be defined by the same header 1020.

The message 1030 includes data to be transmitted by the transmission end of the corresponding packet. For example, the data included in the message 1030 field may be a report, a request, or a response, without being limited thereto.

The packet format 1000 according to another embodiment may further include at least one of transmission end identification information for identifying the transmission end for transmitting the corresponding packet or reception end identification information for identifying the reception end for receiving the corresponding packet.

Here, the transmission end identification information and the reception end identification information may include IP address information, medium access control (MAC) address information, product identification information, etc. However, the present disclosure is not limited thereto and information for distinguishing the reception end and the transmission end in the wireless charging system may be included.

The packet format 1000 according to another embodiment may further include predetermined group identification information for identifying a corresponding reception group if the corresponding packet needs to be received by a plurality of apparatuses.

Figure 11:
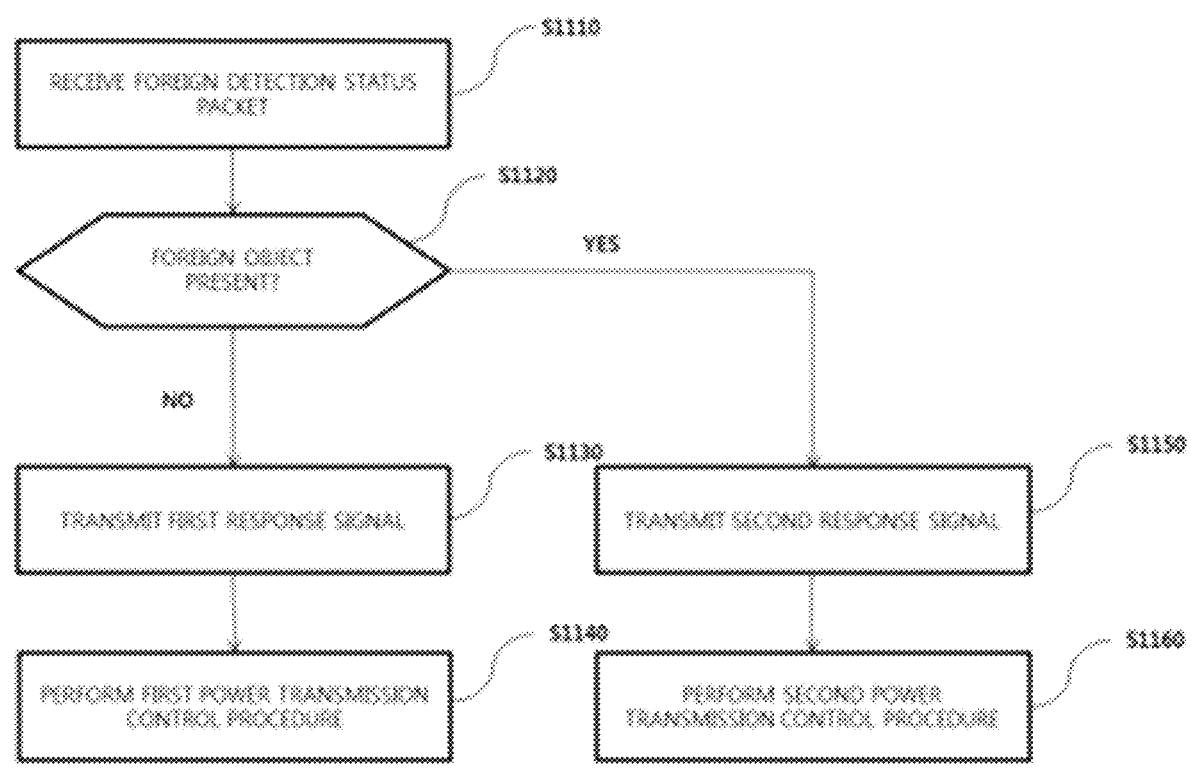
FIG. 11 is a flowchart for explanation of a method of controlling power transmission in a wireless power transmitter according to an embodiment.

FIG. 11 is a flowchart for explanation of a method of controlling power transmission in a wireless power transmitter according to an embodiment.

Upon receiving a negotiation request packet from the wireless power receiver, the wireless power transmitter may transmit a grant packet and may enter the negotiation phase 440.

Referring to FIG. 11, in the negotiation phase 440, the wireless power transmitter may receive an FOD status packet from the wireless power receiver (S1110).

For example, as shown in FIG. 10, the wireless power transmitter may receive the FOD status packet having the reference quality factor value 1031 in the message 1030 field.

The foreign object detection in the negotiation phase 440 is a procedure of comparing a reference value received from a receiver and a measured value and the reference value and the measured value may be various types of parameters.

For example, the reference value and the measured value may include a resonant frequency, resistance, inductance, and the like without being limited thereto.

The wireless power transmitter 510 may measure measured equivalent series resistance (ESR) ESR_measured using a pre-stored measured peak frequency PF_measured and a measured quality factor value Q_measured.

Here, the ESR may a series resistance component parasitic on a capacitor or the like in an RLC series circuit. An actual capacitor and inductor used in an electric circuit are not an ideal component having only capacitance or inductance. However, when a capacitor and an inductor are connected in series to a resistor, the capacitor and the inductor may be very approximately considered as an ideal capacitor and inductor. The resistor may be defined as equivalent series resistance (ESR).

The wireless power transmitter 510 may calculate reference ESR ESR_reference using the received reference peak frequency PF_reference and the reference quality factor value Q_reference.

The wireless power transmitter 510 may detect the foreign object using ESR_measured and ESR_reference. For example, the wireless power transmitter 510 may compare a radio of ESR_reference and ESR_measured with a predetermined threshold value to determine whether the foreign object is present.

The wireless power transmitter may transmit an ACK response or a NACK response to the wireless power receiver according to the foreign object detection result.

Upon receiving the NACK response from the wireless power transmitter, the wireless power receiver may perform control not to supply power of predetermine intensity or greater to an electronic device (or battery/load) through an output terminal until the wireless power transmitter completely stops power transmission. Here, the power of predetermine intensity or greater may be 5 W as a reference without being limited thereto.

Hereinafter, a relationship of ESR, the quality factor value Q, and a frequency will be described.

The quality factor value Q in the ideal RLC series circuit and a tuned radio frequency (TRF) receiver may be calculated according to Equation 1 below.

$$Q = R\sqrt{\frac{L}{C}} = \frac{w_0 L}{R} \qquad \text{(Equation 1)}$$

Here, R, L, and C are resistance, inductance, and capacitance, respectively, $w_0 = 2\pi f_0$ is satisfied, and $f_o$ is a resonant frequency.

$$f_0 = \frac{1}{2\pi\sqrt{LC}}, Q = \frac{1}{w_0 CR}$$

According to is satisfied.

ESR is AC resistance that is always measured at a standard frequency, and high ESR may increase aging and heating of a component, and ripple current.

$$ESR = \frac{1}{w_0 CQ}$$

may be calculated.

Accordingly, in the above embodiment, ESR_reference is calculated as $$\frac{1}{2\pi PF_{ref} CQ_{ref}},$$

and ESR_measured may be measured as $$\frac{1}{2\pi Pf_{measured} C Q_{measured}}.$$

$Q_{measured}$: Q-factor measured by a wireless charger.

$Pf_{measured}$: Peak frequency measured by a wireless charger.

$Q_{ref}$: Reference Q-factor in a wireless charger type coil (in the state in which a receiver is placed and a foreign object is not present).

$Pf_{ref}$: Reference peak frequency in a wireless charger type coil (in the state in which a receiver is placed and a foreign object is not present).

C: Capacitance of a resonant capacitor of a wireless charger.

In this case, a ratio of ESR_referenc and ESR_measured may be calculated as follows.

$$\frac{ESR\_reference}{ESR\_measured} = \frac{\frac{1}{2\pi \cdot Pf_{ref} \cdot C \cdot Q_{ref}}}{\frac{1}{2\pi \cdot Pf_{measured} \cdot C \cdot Q_{measured}}} = \frac{Pf_{measured} \cdot Q_{measured}}{Pf_{ref} \cdot Q_{ref}}$$

$$\frac{ESR\_reference}{ESR\_measured} - 1 = \frac{Pf_{measured} \cdot Q_{measured}}{Pf_{ref} \cdot Q_{ref}} - 1$$

The wireless power transmitter according to an embodiment may determine whether the foreign object is present when a ratio of ESR_reference and ESR_measured is greater than a predefined ratio threshold value. Here, the ratio threshold value may be determined according to an experiment result. For example, when $$\frac{Pf_{measured} Q_{measured}}{Pf_{ref} Q_{ref}} - 1$$

is greater than 0.2, the foreign object may be determined to be present.

The following description will be given in terms of an example in which the wireless power transmitter determines whether the foreign object is present based on the measured quality factor value and the determined quality factor threshold value.

The wireless power transmitter may determine whether the foreign object is present (S1120). Here, the wireless power transmitter may detect an object in the selection phase 410 and may then compare a quality factor value measured prior to entrance into the ping phase 420 and a quality factor threshold value determined based on the reference quality factor value received in the negotiation phase 440 to determine whether the foreign object is present.

As the determination result, when the foreign object is not present, the wireless power transmitter may transmit a first response signal to the corresponding wireless power receiver (S1130). Here, the first response signal may be an ACK signal.

The wireless power transmitter may transmit the first response signal and may then perform a first power transmission control procedure (S1140).

As the determination result of operation 1120, when the foreign object is present, the wireless power transmitter may transmit a second response signal (S1150). Here, the second response signal may be a NACK signal.

The wireless power transmitter may transmit the second response signal and may then perform a second power transmission control procedure (S1160).

Here, the detailed configuration of the first power transmission control procedure and the second power transmission control procedure would be obvious through the following description of drawings.

Figure 12:
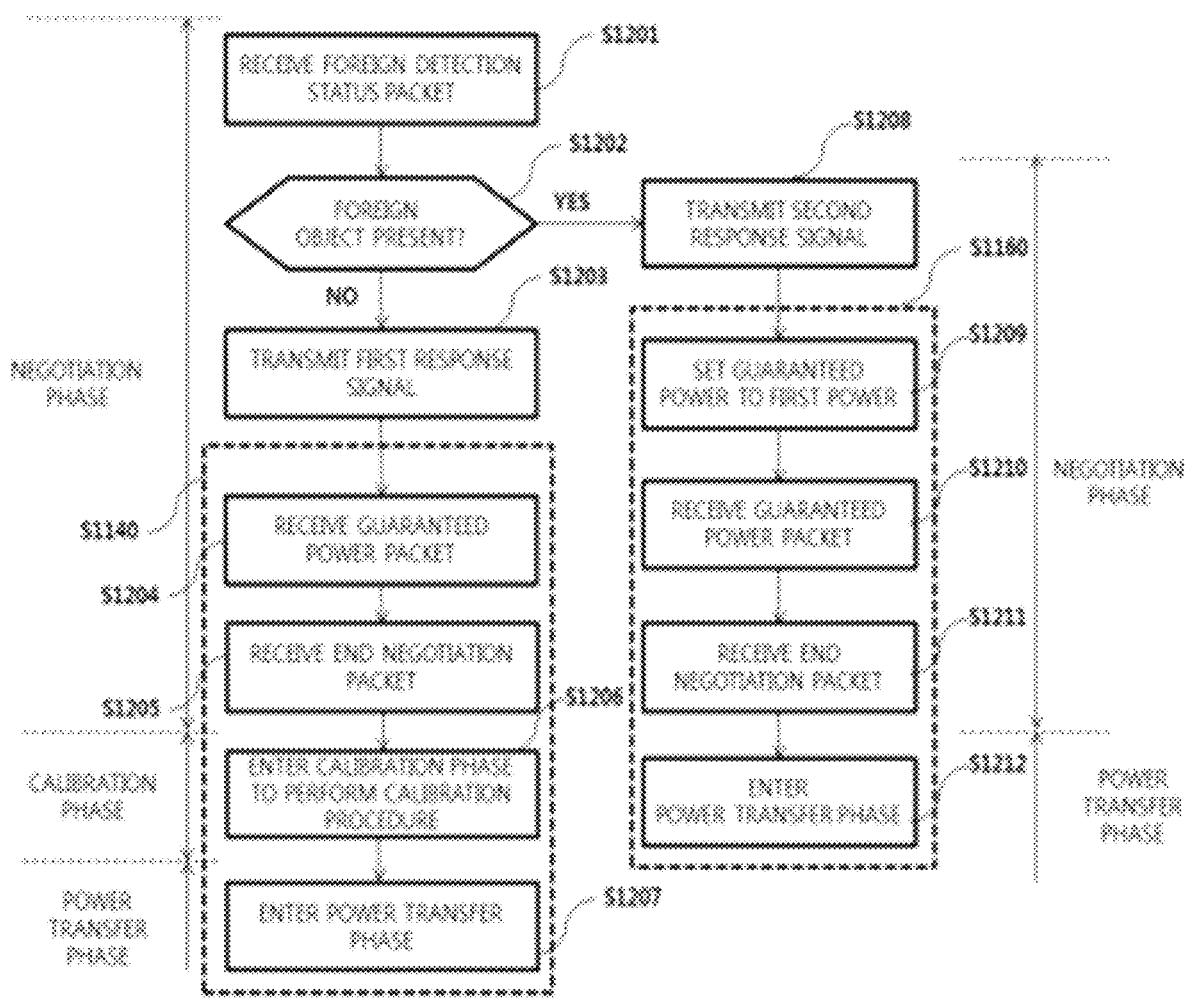
FIG. 12 is a flowchart for explanation of a method of controlling power transmission in a wireless power transmitter according to another embodiment.

FIG. 12 is a flowchart for explanation of a method of controlling power transmission in a wireless power transmitter according to another embodiment.

Upon receiving a negotiation request packet from the wireless power receiver, the wireless power transmitter may transmit a grant packet to enter the negotiation phase 440.

Referring to FIG. 12, in the negotiation phase 440, the wireless power transmitter may receive an FOD status packet from the wireless power receiver (S1201). For example, as shown in FIG. 10, the wireless power transmitter may receive the FOD status packet having the reference quality factor value 1031 in the message 1030 field.

The wireless power transmitter may determine whether the foreign object is present (S1202). Here, the wireless power transmitter may detect an object in the selection phase 410 and may then compare a quality factor value measured prior to entrance into the ping phase 420 and a quality factor threshold value determined based on the reference quality factor value received in the negotiation phase 440 to determine whether the foreign object is present.

As the determination result, when the foreign object is not present, the wireless power transmitter may transmit a first response signal to the corresponding wireless power receiver (S1203). Here, the first response signal may be an ACK signal.

Upon receiving the first response signal, the wireless power transmitter may perform the first power transmission control procedure (S1140).

Hereinafter, the first power transmission control procedure S1140 will be described in detail.

Upon determining that the foreign object is not present, the wireless power transmitter may set guaranteed power to maximum or potential power. For example, the maximum power may be 15 W without being limited thereto, and the maximum power may be greater than 15 W according to a configuration aspect and design of a wireless charger.

In the negotiation phase, the wireless power transmitter may transmit a transmitter power capability packet including the set guaranteed power to the wireless power receiver. Thus, the wireless power receiver may determine required power within guaranteed power of the transmitter.

The wireless power transmitter may receive the guaranteed power packet including information guaranteed power (or required power) requested by the wireless power receiver (S1204).

The wireless power transmitter may receive the end negotiation packet from the wireless power receiver (S1205).

Upon receiving the end negotiation packet, the wireless power transmitter may enter the calibration phase 450 from the negotiation phase 440.

The wireless power transmitter may enter the calibration phase 450 to perform a calibration procedure (S1206).

When the calibration procedure is completed, the wireless power transmitter may enter the power transfer phase 460 to initiate charging (S1207).

As the determination result of operation S1202, when the foreign object is present, the wireless power transmitter may transmit a second response signal in response to the FOD status packet (S1208). Here, the second response signal may be a NACK signal.

Upon receiving the second response signal in response to the FOD status packet, the wireless power receiver may perform the second power transmission control procedure S1160.

Hereinafter, the second power transmission control procedure S1160 will be described in detail.

Upon determining that the foreign object is present, the wireless power transmitter may limit guaranteed power to the first power—that is, minimum guaranteed power (e.g., 5 W)—and may transmit power (S1209). The wireless power transmitter may determine that the foreign object is present and may determine whether the foreign object is present based on a boundary value (or reference value) of preset power loss in the state in which the guaranteed power is set to 5 W. Here, 5 W is predetermined minimum power in a transmission and reception time period, and thus the wireless power transmitter may set a solid reference and may determine the foreign object. The foreign object detection method based on power loss and another type foreign object detection method may also be applied.

Here, the first power may be guaranteed power corresponding to the first power transfer mode. For example, the first power may be set to 5 W without being limited thereto, and the first power may also be set to specific power that is smaller than 5 W. In this case, it may be noted that the wireless power transmitter does not stop transmission of a wireless power signal.

The wireless power transmitter may receive the guaranteed power packet (S1210). Here, the guaranteed power packet may include information on required power determined within available guaranteed power of the wireless power transmitter by the wireless power receiver.

Upon receiving the end negotiation packet from the wireless power receiver, the wireless power transmitter may terminate the negotiation phase 440 and may enter the power transfer phase 460 to perform charging with the set first power (S1212).

In the above embodiment of FIG. 12, the case in which the wireless power transmitter receives the guaranteed power packet and the end negotiation packet during the second power transmission control procedure S1160 has been described, but this is merely an embodiment, and according to another embodiment, at least one of the guaranteed power packet or the end negotiation packet may not be received by the wireless power transmitter.

The wireless power transmitter according to an embodiment may not perform the calibration phase 450 during the second power transmission control procedure S1160.

Here, the calibration phase 450 may be a procedure of comparing transmission power of the transmitter and the reception power of the receiver in order to accurately measure the transmission power and the reception power between the transmitter and the receiver, and a value of power loss.

In this case, in the second power transfer mode in which guaranteed power is equal to or greater than 5 W, power loss is changed as transmission power is increased, and thus a power loss value may be predicted (calculated) and the predicted value may be applied when the transmission power is changed, thereby more accurately calculating power loss. However, the first power transfer mode in which guaranteed power is 4 W that is minimum power may be operated and fixed power may be set to a target, and thus it may not be required to perform the separate calibration phase 450.

When at least one of transmission power or reception power, or power loss is calibrated in the state in which the foreign object is present, calibration is performed under influence of the foreign object, and thus even if the foreign object is actually present, the possibility that the wireless power transmitter determines that the foreign object is not present may be increased. That is, the accuracy of determining the foreign object may be lowered.

According to the disclosure, control may be performed not to perform the calibration phase 450 during the second power transmission control procedure S1160, and thus the accuracy of detecting the foreign object may be increased.

Figure 13:
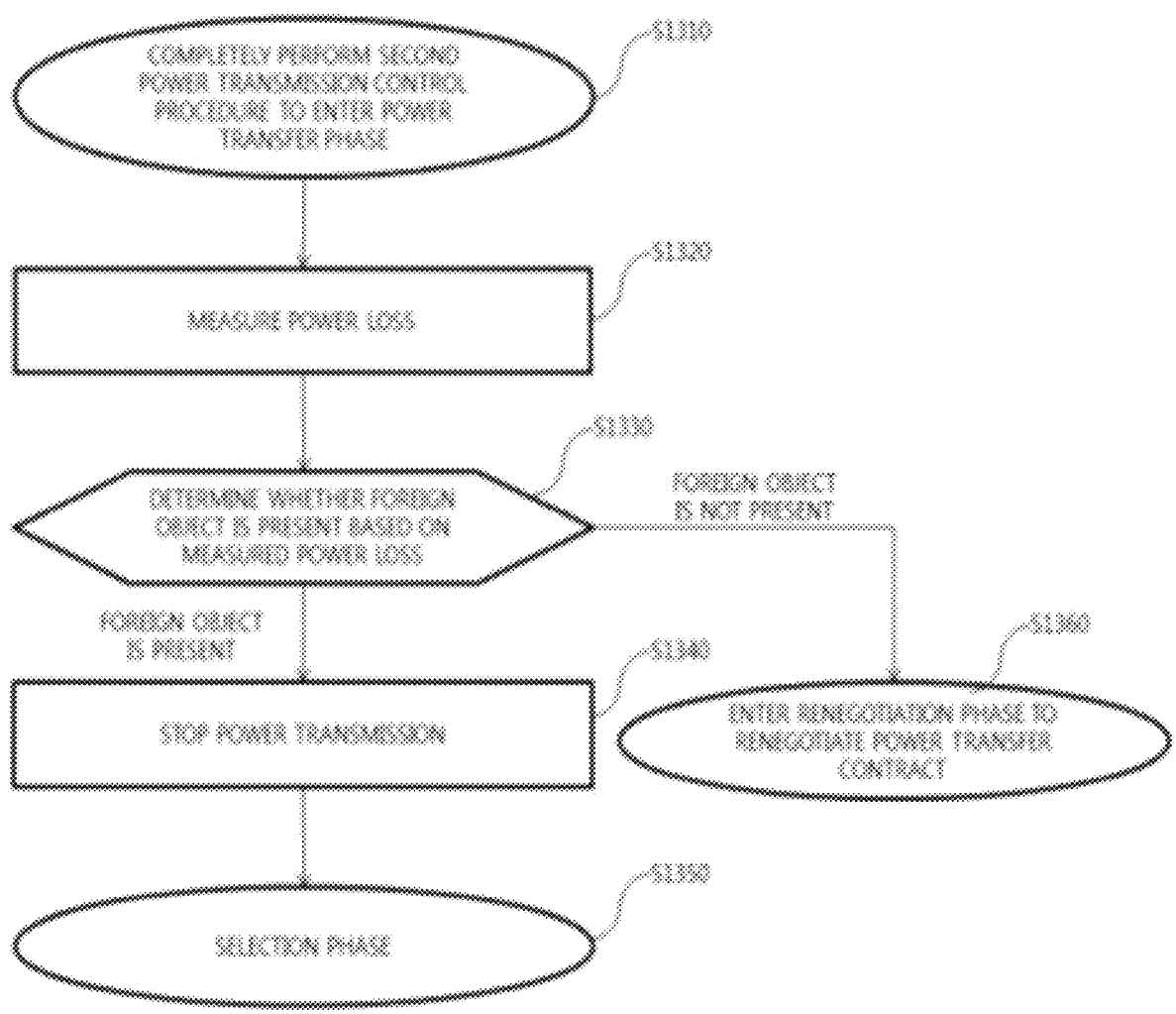
FIG. 13 is a diagram for explanation of a method of controlling power transmission in a wireless power transmitter according to another embodiment.

FIG. 13 is a diagram for explanation of a method of controlling power transmission in a wireless power transmitter according to another embodiment.

Referring to FIG. 13, the wireless power transmitter may completely perform the second power transmission control procedure S1160 to enter the power transfer phase 460 (S1310).

The wireless power transmitter may measure (or calculate or estimate) power loss based on the received power packet received during power transmission—that is, charging—in the power transfer phase 460 (S1320).

Hereinafter, for convenience of description, the case in which the wireless power transmitter measures power loss will be described, but this is merely an embodiment, and it may be noted that power loss is calculated or estimated based on the measured result of transmission power in a wireless power transmission end and the measured result of the reception power received from a wireless power reception end.

For example, power loss may be measured (or estimated) based on the received power packet fed back from the wireless power receiver for a predetermined time period during charging in the power transfer phase 460.

Here, the power loss may include at least one of first power loss measured based on a first reception power value in the state in which the wireless power receiver is not connected to a battery (or a load) or second power loss measured based on a second reception power value measured in the state in which the wireless power receiver is connected to a battery (or a load).

For example, the wireless power transmitter may measure power loss whenever the received packet is received during a predetermined period—for example, 10 minutes—and may determine an average value (a smallest value or a highest value) of the measured power loss as final power loss.

In another example, the wireless power transmitter may also measure power loss to correspond N received power packets that are continuously received after entrance into the power transfer phase 460.

The wireless power transmitter may determine whether the foreign object is present based on the measured power loss (S1330).

For example, when the measured power loss is greater than a predetermined power loss threshold value, the wireless power transmitter may determine that the foreign object is present. In contrast, when the measured power loss is equal to less than the predetermined power loss, the wireless power transmitter may determine that the foreign object is not present.

In another example, when the power loss estimated to corresponding to N received power packets that are continuously received after entrance into the power transfer phase falls within the predetermined power loss threshold value, the wireless power transmitter may determine that the foreign object is not present. When the power loss falls within the threshold value for a specific time period, or after a specific time period elapses, even if the power loss falls within the threshold value, the wireless power transmitter may also determine that the foreign object is not present.

In contrast, when the power loss estimated to correspond to at least one received power packet among N received power packets that are continuously received after entrance into the power transfer phase is greater than a predetermined power loss threshold value, the wireless power transmitter may determine that the foreign object is present.

As the determination result, when the foreign object is present, the wireless power transmitter may stop power transmission and may enter the selection phase (S1340 and S1350).

As the determination result of operation 1330, when the foreign object is not present, the wireless power transmitter may enter a renegotiation phase and may renegotiate a power transfer contract with the wireless power receiver (S1360). In this case, the negotiated guaranteed power may be equal to or greater than 5 W.

According to the renegotiation result, the wireless power transmitter may enter the power transfer phase 460 again and may continuously perform charging on the corresponding wireless power receiver. Here, after the renegotiation, the wireless power transmitter may transmit power between the first power and the second power and may perform charging. Here, the first power may be 5 W and the second power may be 15 W, but this is merely an embodiment, and intensity of the second power may be greater than or smaller than 15 W.

For example, when the foreign object is not detected after entrance into the power transfer phase, the wireless power transmitter may change the first power transfer mode to the second power transfer mode through renegotiation to increase intensity of transmission power and to reduce a charging time.

Figure 14:
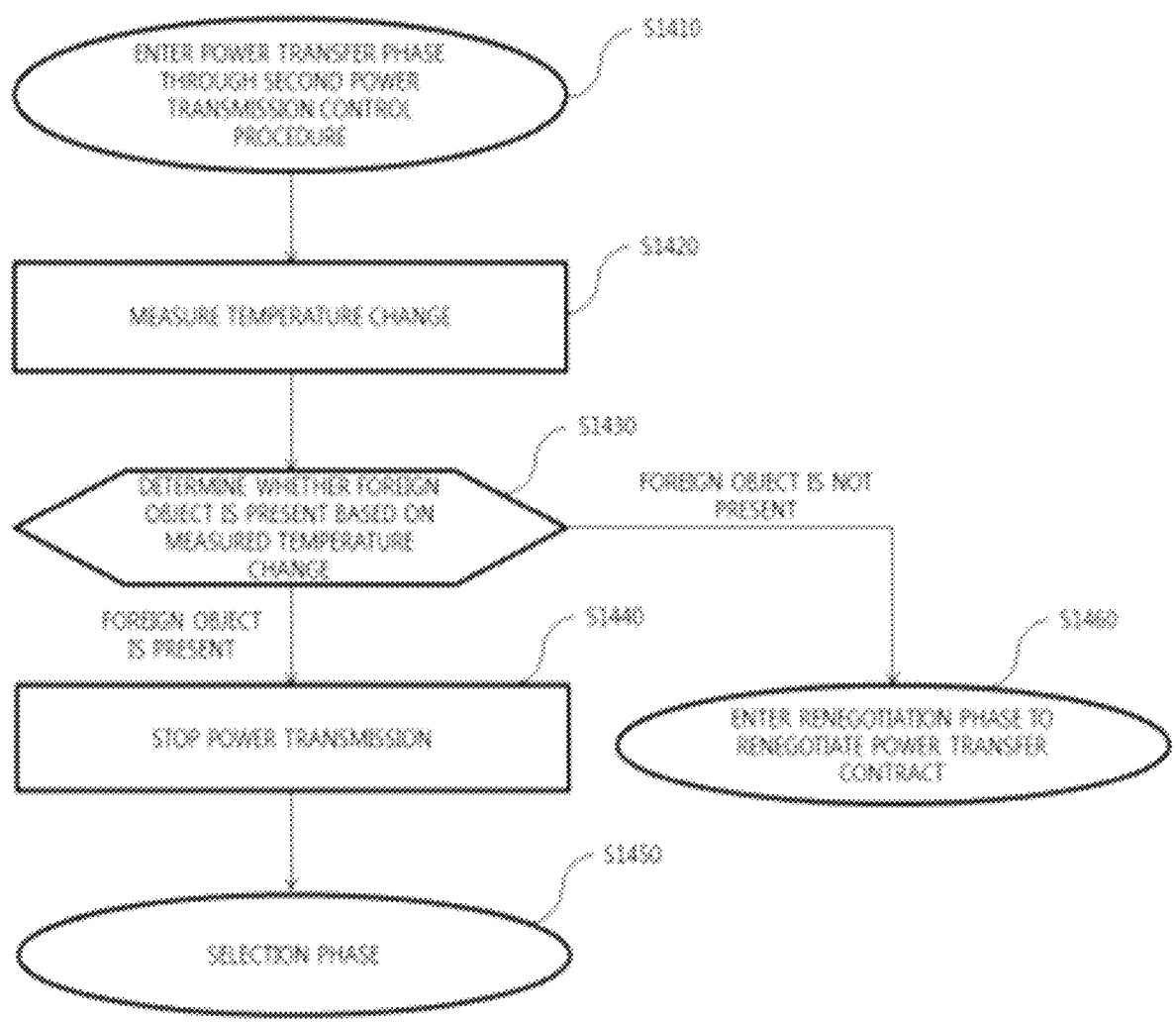
FIG. 14 is a diagram for explanation of a method of controlling power transmission in a wireless power transmitter according to another embodiment.

FIG. 14 is a diagram for explanation of a method of controlling power transmission in a wireless power transmitter according to another embodiment.

Referring to FIG. 14, the wireless power transmitter may completely perform the second power transmission control procedure S1160 and may enter the power transfer phase 460 (S1410).

The wireless power transmitter may measure a temperature change during power transmission in the power transfer phase 460 (S1420).

For example, in the power transfer phase 460, the wireless power transmitter may measure a ratio of an internal temperature change amount or a temperature change during a unit time during power transmission. Here, a position of the wireless power transmitter, at which the temperature change is measured, may be a transmission coil of the transmission antenna 640 without being limited thereto, and the temperature change may also be measured at another position of the wireless power transmitter—for example, a control circuit board included in the wireless power transmitter, and a charging bed—of the wireless power transmitter according to a design of one of ordinary skill in the art.

The wireless power transmitter according to another embodiment may also receive temperature information measured by the wireless power receiver at a predetermined period during power transmission. The wireless power transmitter may also measure the temperature change based on the temperature information received from the wireless power receiver.

The wireless power transmitter according to another embodiment may determine a final temperature change based on the internally measured first temperature change and the second temperature change that is measured based on the temperature information received from the wireless power receiver.

The wireless power transmitter may determine whether the foreign object is present based on the measured temperature change (S1430). For example, when the measured temperature change is greater than a predetermined temperature change threshold value, the wireless power transmitter may determine that the foreign object is present.

In contrast, when the measured temperature change is equal to or less than the predetermined temperature change threshold value, the wireless power transmitter may determine that the foreign object is not present.

As the determination result, when the foreign object is present, the wireless power transmitter may stop power transmission and may enter the selection phase (S1440 and S1450).

As the determination result of operation 1430, when the foreign object is not present, the wireless power transmitter may enter the renegotiation phase to renegotiate a power transfer contract with the wireless power receiver (S1360).

As the renegotiation result, the wireless power transmitter may enter the power transfer phase 460 again and may continuously perform charging.

For example, when the foreign object is not detected after entrance into the power transfer phase, the wireless power transmitter may change the first power transfer mode to the second power transfer mode via renegotiation to increase intensity of transmission power and to reduce a charging time. The wireless power transmitter may transmit power between the first power and the second power in the second power transfer mode. Here, the first power may be 5 W and the second power may be 15 W, but this is merely an embodiment, and the second power may be smaller than or greater than 15 W according to a design of one of ordinary skill in the art and a configuration aspect of the wireless power transmitter.

Figure 15:
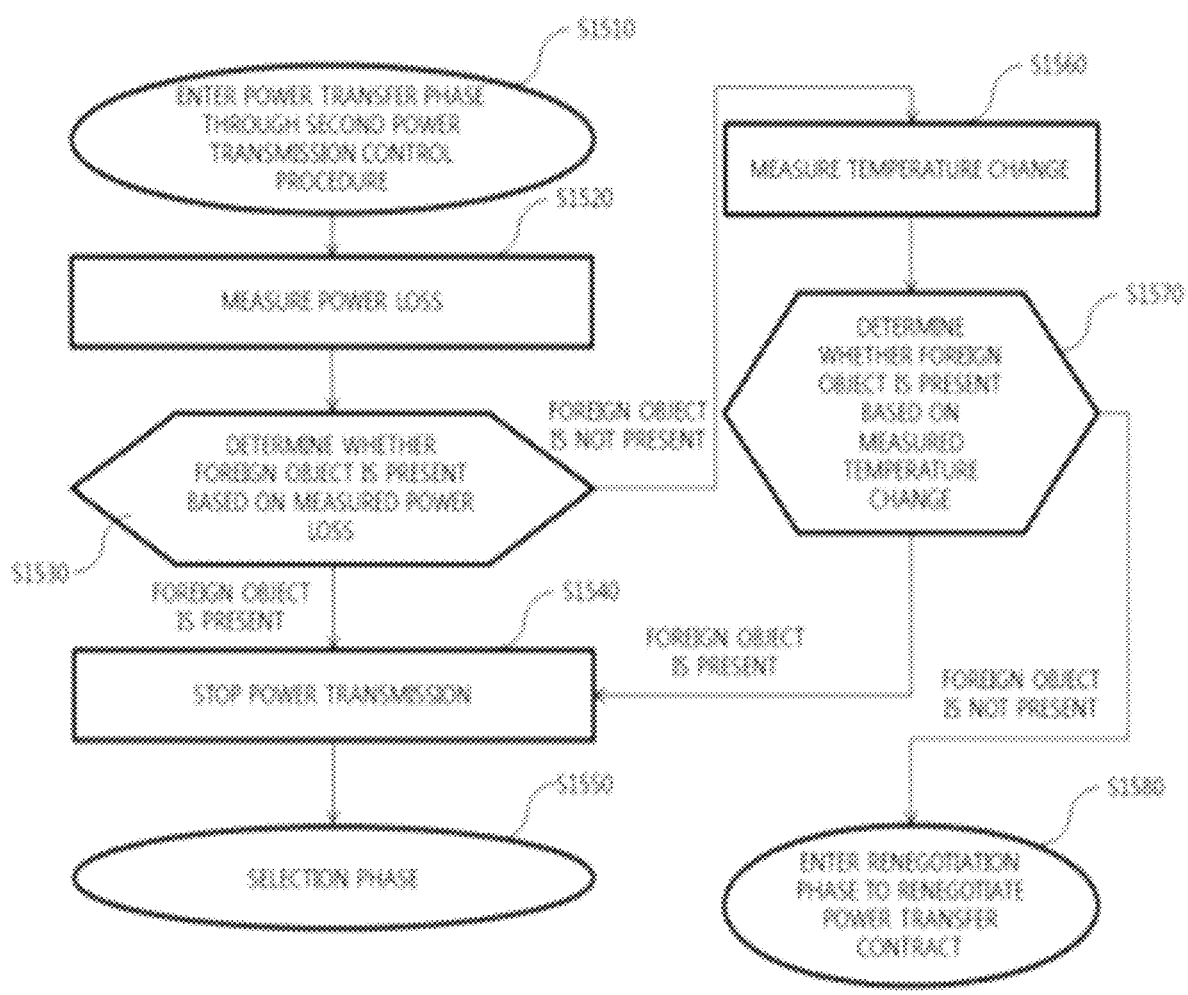
FIG. 15 is a diagram for explanation of a method of controlling power transmission in a wireless power transmitter according to another embodiment.

FIG. 15 is a diagram for explanation of a method of controlling power transmission in a wireless power transmitter according to another embodiment.

Referring to FIG. 15, the wireless power transmitter may completely perform the second power transmission control procedure S1160 and may enter the power transfer phase 460 (S1510).

The wireless power transmitter may measure power loss of the received power packet received during power transmission in the power transfer phase 460 (S1520).

For example, power loss may be measured based on the received power packet fed back from the wireless power receiver during charging in the power transfer phase 460.

Here, the power loss may include at least one of first power loss measured based on a first reception power value in the state in which the wireless power receiver is not connected to a battery (or a load) or second power loss measured based on a second reception power value measured in the state in which the wireless power receiver is connected to a battery (or a load).

The wireless power transmitter may determine whether the foreign object is present based on the measured power loss (S1530). For example, when the measured power loss is greater than a predetermined power loss threshold value, the wireless power transmitter may determine that the foreign object is present. In contrast, when the measured power loss is equal to or less than a predetermined power loss threshold value, the wireless power transmitter may determine that the foreign object is not present.

As the determination result, when the foreign object is present, the wireless power transmitter may stop power transmission and may enter the selection phase (S1540 and S1550).

As the determination result of operation 1530, when the foreign object is not present, the wireless power transmitter may measure a temperature change during power transmission in the power transfer phase 460 (S1560).

For example, in the power transfer phase 460, the wireless power transmitter may measure a ratio of an internal temperature change amount or a temperature change during a unit time during power transmission. Here, a position of the wireless power transmitter, at which the temperature change is measured, may be in the vicinity of the transmission coil without being limited thereto, and the temperature change may also be measured at another position of the wireless power transmitter according to a design of one of ordinary skill in the art.

The wireless power transmitter according to another embodiment may also receive temperature information measured by the wireless power receiver at a predetermined period during power transmission. The wireless power transmitter may also measure the temperature change based on the temperature information received from the wireless power receiver.

The wireless power transmitter according to another embodiment may determine a final temperature change based on the internally measured first temperature change and the second temperature change that is measured based on the temperature information received from the wireless power receiver.

The wireless power transmitter may determine whether the foreign object is present based on the measured temperature change (S1570). For example, when the measured temperature change is greater than a predetermined temperature change threshold value, the wireless power transmitter may determine that the foreign object is present.

In contrast, when the measured temperature change is equal to or less than the predetermined temperature change threshold value, the wireless power transmitter may determine that the foreign object is not present.

As the determination result, when the foreign object is present, the wireless power transmitter may stop power transmission and may enter the selection phase (S1540 and S1550).

As the determination result of operation 1570, when the foreign object is not present, the wireless power transmitter may enter the renegotiation phase to renegotiate a power transfer contract with the wireless power receiver (S1580). As the renegotiation result, the wireless power transmitter may enter the power transfer phase 460 again and may continuously perform charging.

For example, when the foreign object is not detected after entrance into the power transfer phase, the wireless power transmitter may change the first power transfer mode to the second power transfer mode via renegotiation to increase intensity of transmission power and to reduce a charging time.

In the above embodiment of FIG. 15, the case in which the wireless power transmitter performs the foreign object detection procedure based on power loss and then performs the foreign object detection procedure based on a temperature change according to the determination result has been described, but this is merely an embodiment, and according to another embodiment, the wireless power transmitter may perform the foreign object detection procedure based on a temperature change and may then perform the foreign object detection procedure based on power loss according to the determination result.

Figure 16A:
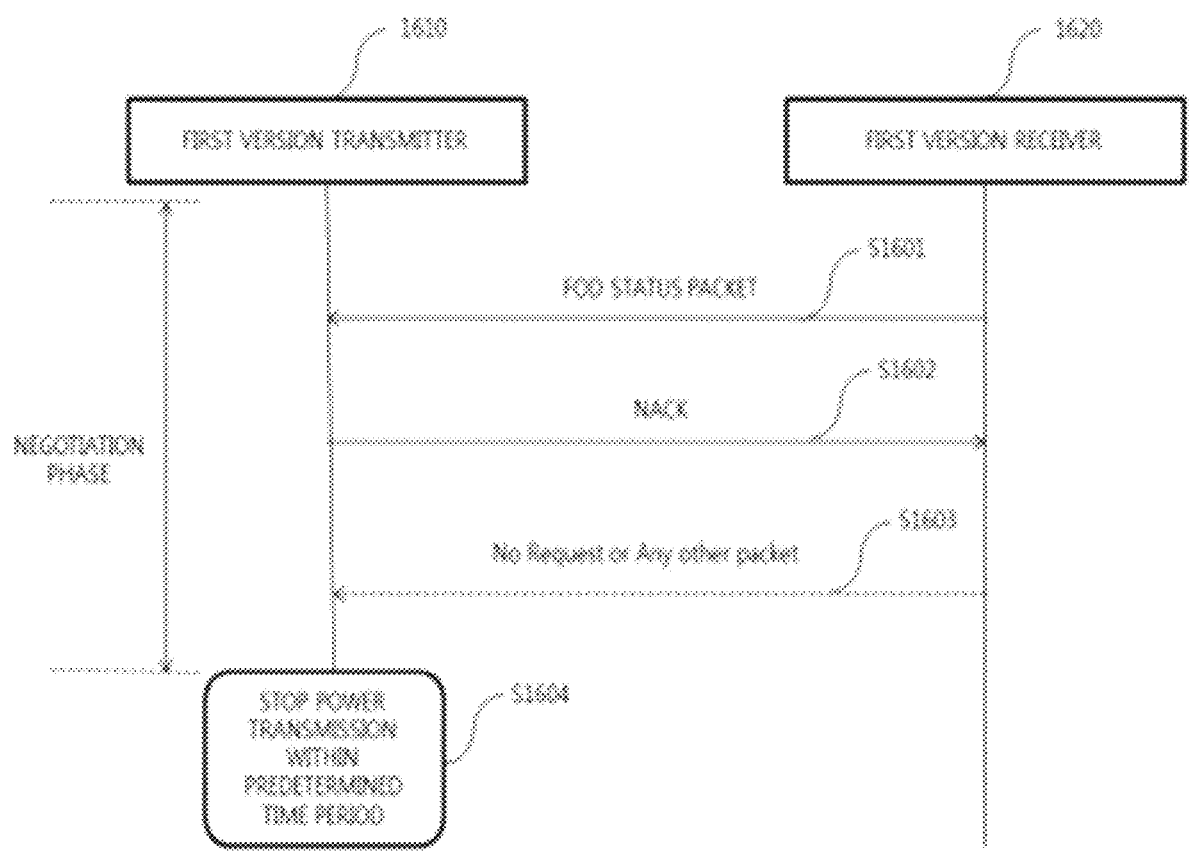
FIG. 16A is a flowchart for explanation of a method of controlling wireless power transmission based on foreign object detection when a transmitter and a receiver have the same version.

FIG. 16A is a flowchart for explanation of a method of controlling wireless power transmission based on foreign object detection when a transmitter and a receiver have the same version.

In the following description of embodiments, it may be noted that the second version is a higher-ranking and more recently released version than the first version.

In detail, FIG. 16A is a flowchart for explanation of a method of controlling wireless power transmission based on foreign object detection when both the transmitter and the receiver have a low-ranking version, that is, a first version—for example, 1.2 V—. Here, the version may be based on the WPC Qi standard.

Referring to FIG. 16A, when entering the negotiation phase, a first version transmitter 1610 may receive an FOD status packet from a first version receiver 1620 (S1601).

The first version transmitter 1610 may determine whether the foreign object is present based on the received FOD status packet, and as the determination result, when the foreign object is present, the first version transmitter 1610 may transmit a NACK signal to the first version receiver 1620 (S1602).

Upon receiving a NACK response signal to an FOD status packet, the first version receiver 1620 may not transmit any packet or may transmit a specific packet (S1603).

Upon transmitting a NACK signal to the first version receiver 1620, the first version transmitter 1610 may stop power transmission within a predetermined time period—for example, 5 seconds—(S1604). In this case, the first version transmitter 1610 may disregard any packet received from the first version receiver 1620.

Figure 16B:
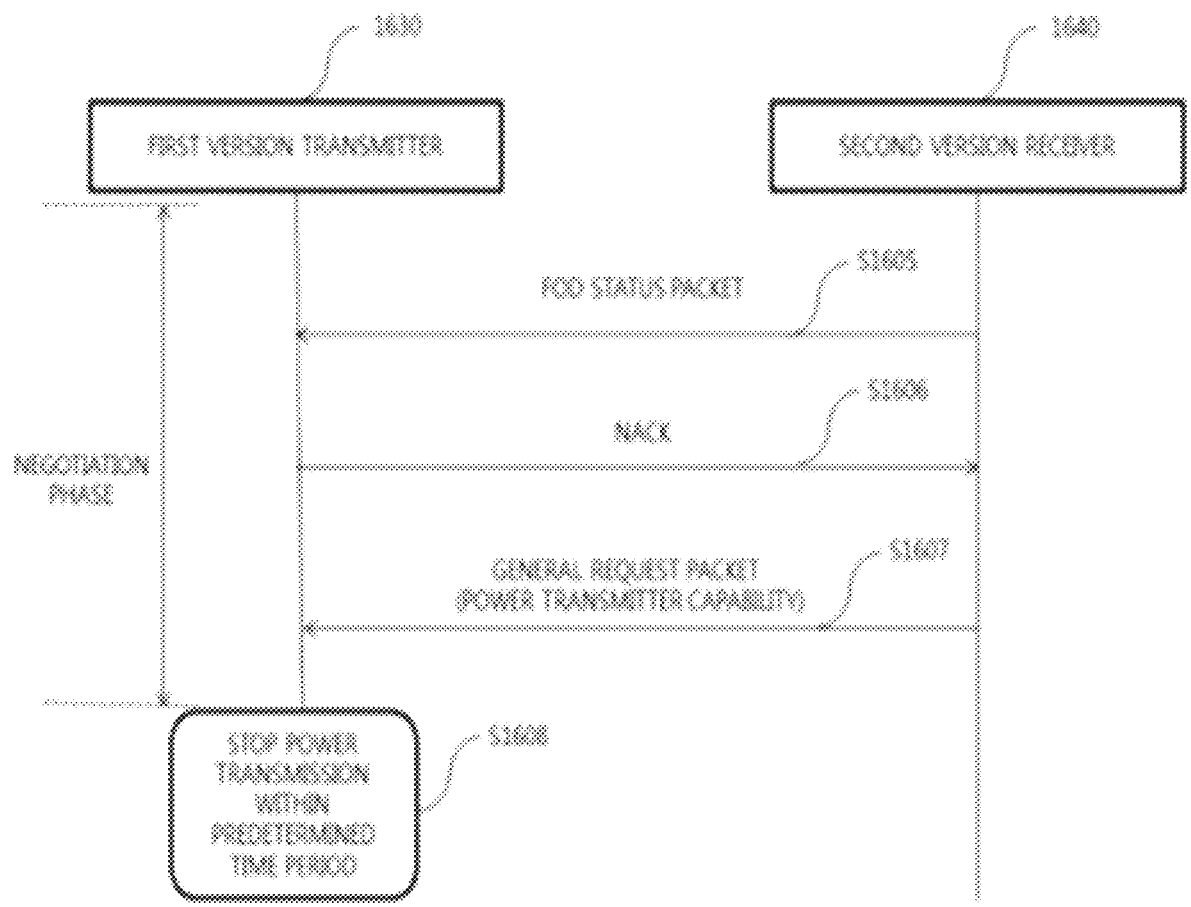
FIG. 16B is a flowchart for explanation of a method of controlling wireless power transmission based on foreign object detection when a transmitter and a receiver have different versions.

FIG. 16B is a flowchart for explanation of a method of controlling wireless power transmission based on foreign object detection when a transmitter and a receiver have different versions.

In detail, FIG. 16B is a flowchart for explanation of a method of controlling wireless power transmission based on foreign object detection when the receiver has a higher-ranking version than the transmitter.

Referring to FIG. 16B, upon entering the negotiation phase, a first version transmitter 1630 may receive an FOD status packet from a second version receiver 1640 (S1605).

The first version transmitter 1630 may determine whether the foreign object is present based on the received FOD status packet, when the foreign object is present as the determination result, the first version transmitter 1630 may transmit a NACK signal to the second version receiver 1640 (S1606).

Upon receiving a NACK response signal to the FOD status packet, the second version receiver 1640 may transmit a general request packet (GRP) including power transmitter capability (PTC) information to the first version transmitter 1630 (S1607).

Upon transmitting a NACK signal to the second version receiver 1640 having a higher-ranking version than the first version transmitter 1630, the first version transmitter 1630 may disregard the received GRP and may stop power transmission within a predetermined time period—for example, 5 seconds—(S1608).

Figure 16C:
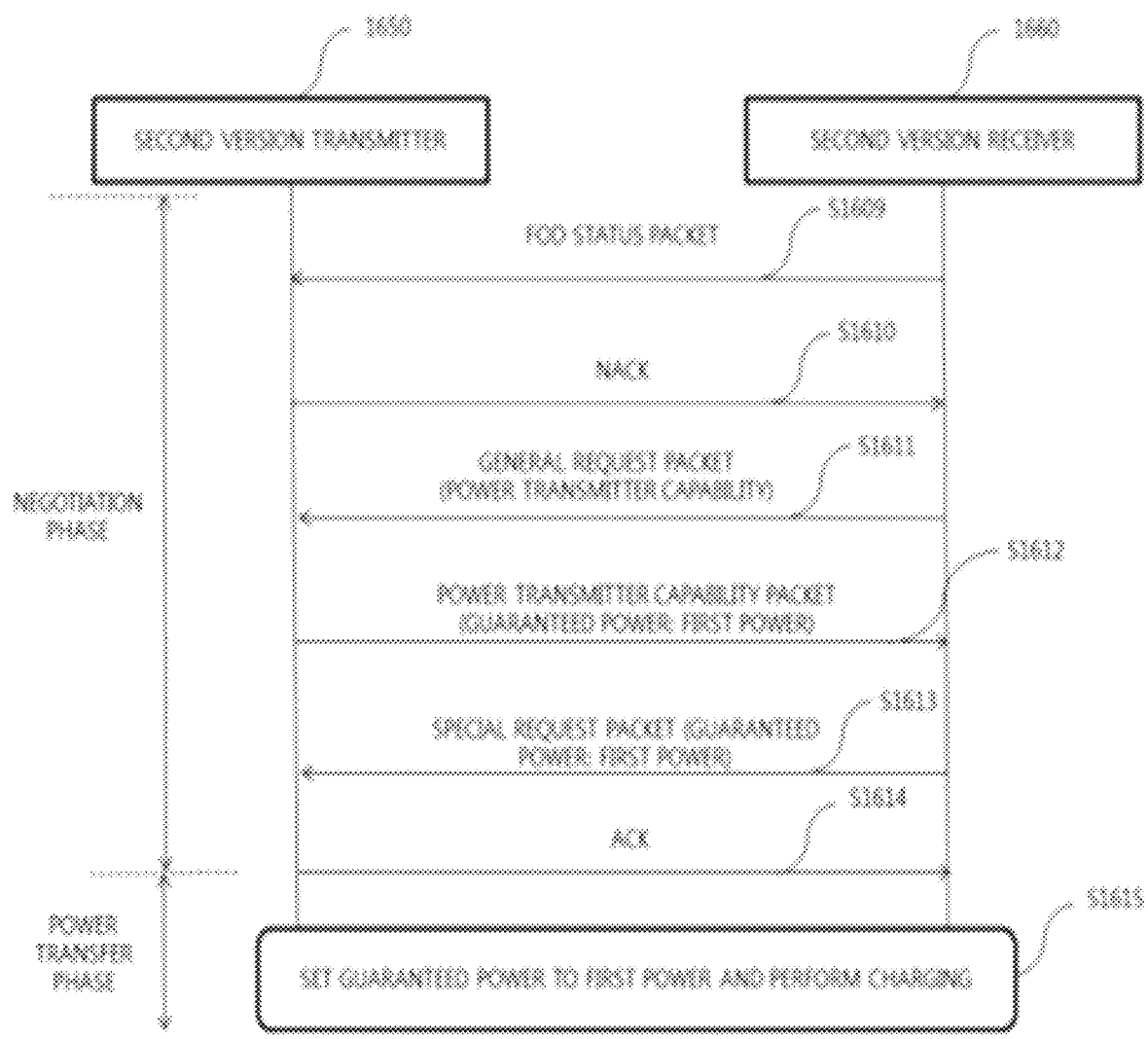
FIG. 16C is a flowchart for explanation of a method of controlling wireless power transmission based on foreign object detection when a transmitter and a receiver have the same version.

FIG. 16C is a flowchart for explanation of a method of controlling wireless power transmission based on foreign object detection when a transmitter and a receiver have the same version.

In detail, FIG. 16C is a flowchart for explanation of a method of controlling wireless power transmission based on foreign object detection when both the transmitter and the receiver have a high-ranking version, that is, a second version—for example, 1.3 V—.

Referring to FIG. 16C, upon entering the negotiation phase, a second version transmitter 1650 may receive an FOD status packet from a second version receiver 1660 (S1609).

The second version transmitter 1650 may determine whether the foreign object is present based on the received FOD status packet, and as the determination result, when the foreign object is present, the second version transmitter 1650 may transmit a NACK signal to the second version receiver 1660 (S1610).

Upon receiving a NACK response signal to the FOD status packet, the second version receiver 1660 may transmit a general request packet (GRP) including power transmitter capability (PTC) information to the second version transmitter 1650 (S1611).

Upon receiving the GRP from the second version receiver 1660 having the same version as that of the second version transmitter 1650, the second version transmitter 1650 may transmit a PTC packet in which guaranteed power is set to the first power, to the second version receiver 1660 (S1612).

In this case, the second version receiver 1660 may transmit a special request packet in which guaranteed power is set to the first power, to the second version transmitter 1650 (S1613).

The second version transmitter 1650 may transmit an ACK signal in response to the special request packet (S1614) and may enter the power transfer phase to set the guaranteed power to the first power and to perform charging (S1615).

The wireless power transmitter according to the above embodiment of FIG. 16C may advantageously downward-adjust the guaranteed power and may stably maintain a charging state even if the foreign object is detected in the negotiation phase.

In the above embodiment of FIG. 16C, upon receiving a special request packet in which guaranteed power is set to be larger than the first power in operation 1613 operation, the second version transmitter 1650 may transmit a NACK response to the second version receiver 1660 in response to the special request packet.

Figure 16D:
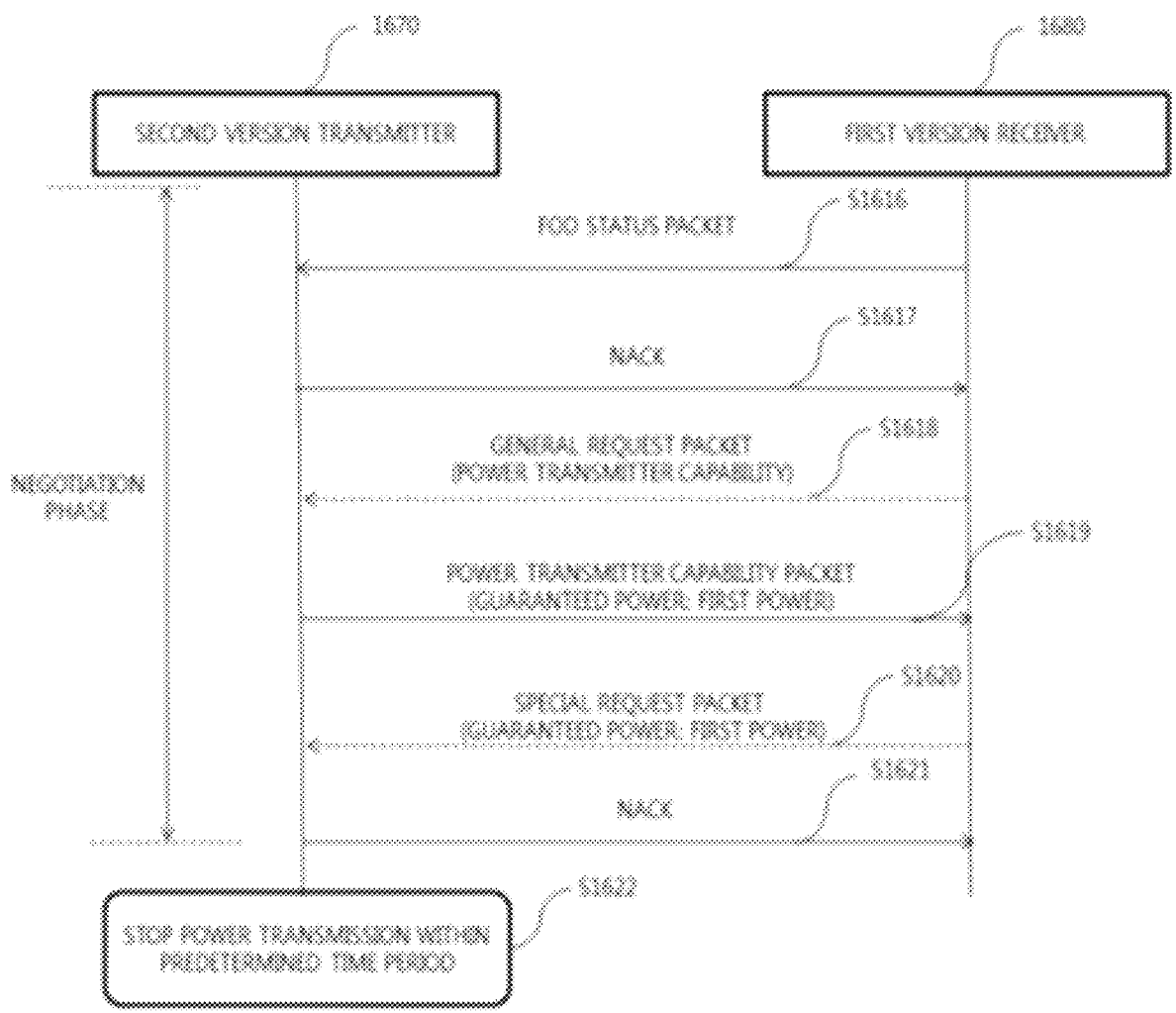
FIG. 16D is a flowchart for explanation of a method of controlling wireless power transmission based on foreign object detection when a transmitter has a higher-ranking version than a receiver.

FIG. 16D is a flowchart for explanation of a method of controlling wireless power transmission based on foreign object detection when a transmitter has a higher-ranking version than a receiver.

In detail, FIG. 16D is a flowchart for explanation of a method of controlling wireless power transmission during foreign object detection to maintain backward compatibility when a version of the receiver is a first version—for example, 1.2 V—that is a lower-ranking version than the transmitter.

Referring to FIG. 16D, upon entering the negotiation phase, a second version transmitter 1670 may receive an FOD status packet from a first version receiver 1680 (S1616).

The second version transmitter 1670 may determine whether the foreign object is present based on the received FOD status packet, and as the determination result, when the foreign object is present, the second version transmitter 1670 may transmit a NACK signal to the first version receiver 1680 (S1617).

For example, upon receiving a NACK response signal to an FOD status packet, the first version receiver 1680 may transmit the general request packet (GRP) including the power transmitter capability (PTC) information to the second version transmitter 1670 (S1618). In another example, upon receiving an NACK response signal to the FOD status packet according to a type of the receiver, the first version receiver 1680 may not transmit any packet to the second version transmitter 1670.

Upon transmitting a NACK signal to the first version receiver 1680 having a lower-ranking version than the second version transmitter 1670, the second version transmitter 1670 may transmit a PTC packet in which guaranteed power is set to the first power, to the first version receiver 1680 (S1619).

For example, the first version receiver 1680 may transmit a special request packet in which guaranteed power is set to the first power, to the second version transmitter 1670 (S1620). In another example, upon receiving a NACK response signal to the FOD status packet according to a type of the receiver, the first version receiver 1680 may not transmit any packet to the second version transmitter 1670.

The second version transmitter 1650 may transmit a NACK signal in response to the special request packet (S1621) and may stop power transmission within a predetermined time period—for example, 5 seconds without being limited thereto—. The second version transmitter 1650 may transmit a NACK signal in response to the special request packet, and thus the first version receiver 1680 may be prevented from entering a calibration phase after the negotiation phase is terminated.

Effects of the method, the apparatus, and the system according to the disclosure will be described below.

The disclosure may advantageously provide a method and apparatus for controlling wireless power transmission for wireless charging.

The disclosure may advantageously provide a wireless power transmitter for more accurately detecting a foreign object.

The disclosure may advantageously provide a method and apparatus for controlling wireless power transmission for minimizing foreign object detection error to prevent unnecessary stop of charging.

The disclosure may advantageously provide a wireless power transmitter for preventing a device from being damaged due to a foreign object and for seamless charging through adaptive transmission power control according to whether the foreign object is present.

In addition, the disclosure may advantageously provide a wireless power transmitter for stably transmitting wireless power in a wide range according to a type of a receiver and a power transmission environment.

It will be appreciated by persons skilled in the art that that the effects that could be achieved with the embodiments of the disclosure are not limited to what has been particularly described hereinabove and other advantages of the disclosure will be more clearly understood from the detailed description taken in conjunction with the accompanying drawings.

The methods according to the above embodiments can be embodied as a program to be executed in a computer and can be stored in a computer readable recording medium. Examples of the computer readable recording medium include read-only memory (ROM), random-access memory (RAM), CD-ROMs, magnetic tapes, floppy discs, optical data storage devices, etc.

The computer readable recording medium can also be distributed over network coupled computer systems so that the computer readable code is stored and executed in a distributed fashion. Also, functional programs, codes, and code segments for accomplishing the embodiments can be easily construed by programmers skilled in the art to which the embodiments pertain.

Those skilled in the art will appreciate that the embodiments of the disclosure may be carried out in other specific ways than those set forth herein without departing from the spirit and essential characteristics of the embodiments.

The above embodiments are therefore to be construed in all aspects as illustrative and not restrictive. The scope of the embodiments should be determined by the appended claims and their legal equivalents, not by the above description, and all changes coming within the meaning and equivalency range of the appended claims are intended to be embraced therein.

What is claimed is:

1. A method of receiving power of a wireless power receiver, comprising:
   a signal transmission phase of transmitting a signal including an FOD status packet to a wireless power transmitter;
   a power reception phase of receiving a first power from the wireless power transmitter when a NAK response indicating that a foreign object is present in the charging area of the wireless power transmitter is received from the wireless power transmitter, or receiving a second power from the wireless power transmitter when an ACK response indicating that the foreign object is not present in the charging area of the wireless power transmitter is received from the wireless power transmitter, in response to the FOD status packet;
   a phase of transmitting a reception power packet including information on reception power intensity to the wireless power transmitter; and
   a phase of receiving a signal including information on a result of determining whether the foreign object is present in the charging area from the wireless power transmitter using information measured or calculated by the wireless power transmitter in response to the reception power packet, while receiving the second power,
   wherein the FOD status packet includes a first FOD status packet and a second FOD status packet;
   wherein the first FOD status packet includes one of a reference quality factor or a reference peak frequency; and
   wherein the second FOD status packet includes the other of the reference quality factor and the reference peak frequency that is different from the first FOD status packet.

2. The method of claim 1, wherein the information on the result of determining whether the foreign object is present in the charging area, using information measured or calculated in response to the reception power packet, is based on information other than information included in the FOD status packet.

3. The method of claim 1, further comprising:
   a phase of modulating a signal including the FOD status packet, prior to the signal transmission phase.

4. The method of claim 3, further comprising:
   a phase of measuring the intensity of the wireless power received from the wireless power transmitter, after the power reception phase.

5. The method of claim 1, wherein the wireless power receiver receives the first power when a NAK response to at least one of the first FOD status packet and the second FOD status packet is received from the wireless power transmitter.

6. The method of claim 1, wherein the wireless power receiver receives the second power when a ACK response to the first FOD status packet and the second FOD status packet is received from the wireless power transmitter.

7. The method of claim 1, wherein an intensity of the second power is greater than an intensity of the first power.

8. The method of claim 2, wherein the other information includes a power loss value.

9. The method of claim 1, further comprising:
   a phase of measuring the intensity of the wireless power received from the wireless power transmitter, after the power reception phase.

* * * * *